US010671098B2

(12) United States Patent
Moss et al.

(10) Patent No.: US 10,671,098 B2
(45) Date of Patent: Jun. 2, 2020

(54) SYSTEM, METHOD, AND APPARATUS FOR BALANCING AN HVAC SYSTEM

(71) Applicant: Dwyer Instruments, Inc., Michigan City, IN (US)

(72) Inventors: Robert Austin Moss, Saint Joseph, MI (US); Alejandro Ignacio Baez Guada, Chicago, IL (US); Justin Foster, Michigan City, IN (US)

(73) Assignee: DWYER INSTRUMENTS, INC., Michigan City, IN (US)

( * ) Notice: Subject to any disclaimer, the term of this patent is extended or adjusted under 35 U.S.C. 154(b) by 962 days.

(21) Appl. No.: 14/976,471

(22) Filed: Dec. 21, 2015

(65) Prior Publication Data

US 2017/0176043 A1    Jun. 22, 2017

(51) Int. Cl.
*G05D 7/06* (2006.01)
*F24F 11/30* (2018.01)
(Continued)

(52) U.S. Cl.
CPC ............ *G05D 7/0664* (2013.01); *F24F 11/30* (2018.01); *F24F 11/62* (2018.01); *F24F 11/75* (2018.01);
(Continued)

(58) Field of Classification Search
CPC ............... G05B 2110/40; G05D 7/0664; F24F 2110/40
See application file for complete search history.

(56) References Cited

U.S. PATENT DOCUMENTS 3,748,901 A * 7/1973 DeBaun .................... G01F 1/40
                                                                73/861.66
4,030,358 A * 6/1977 Noll ........................ G01P 5/00
                                                                73/861.66
(Continued)

FOREIGN PATENT DOCUMENTS

EP    0926579 A1 * 6/1999 ............ F24F 3/0442
EP    2375178 A1    10/2011
(Continued)

OTHER PUBLICATIONS

International Search Report corresponding to International Application No. PCT/US2015/067046, dated Sep. 6, 2016, pp. 1-11.

*Primary Examiner* — Jennifer L Norton
(74) *Attorney, Agent, or Firm* — Tarolli, Sundheim, Covell & Tummino LLP

(57) ABSTRACT

A method and apparatus for balancing terminals of an HVAC system uses an air flow measuring device by inputting into a computer processing portion of the air flow measuring device predetermined target flows for each terminal; acquiring via the air flow measuring device initially measured air flows through each of the terminals, the initially measured air flows being provided to the computer processing portion; and adjusting the terminals in the HVAC system to flow set points according to instructions from the computer processing portion, the computer processing portion being programmed to calculate the flow set point for each terminal given current HVAC system load conditions, that will result in all terminals being set to target flow after all terminals have been adjusted as instructed.

15 Claims, 13 Drawing Sheets

(51) Int. Cl.
  *F24F 11/62* (2018.01)
  *F24F 11/75* (2018.01)
  *F24F 11/77* (2018.01)
  *F24F 110/30* (2018.01)
  *F24F 11/84* (2018.01)
  *F24F 110/40* (2018.01)

(52) U.S. Cl.
  CPC .............. *F24F 11/77* (2018.01); *F24F 11/84* (2018.01); *F24F 2110/30* (2018.01); *F24F 2110/40* (2018.01); *G05B 2219/2614* (2013.01)

(56) References Cited

U.S. PATENT DOCUMENTS

| | | | | |
|---|---|---|---|---|
| 4,231,253 A | * | 11/1980 | Ohnhaus | G01F 1/40 73/861.62 |
| 4,548,076 A | * | 10/1985 | Haake | G01F 7/00 73/202 |
| 4,754,651 A | * | 7/1988 | Shortridge | G01F 1/363 73/1.34 |
| 5,172,565 A | | 12/1992 | Wruck et al. | |
| 5,667,189 A | * | 9/1997 | Kester | F16M 13/022 248/601 |
| 5,988,860 A | * | 11/1999 | Hefferen | G05D 7/0635 236/49.3 |
| 8,483,883 B1 | | 7/2013 | Watson | |
| 2010/0163633 A1 | * | 7/2010 | Barrett | F24F 13/082 236/49.3 |
| 2011/0094311 A1 | * | 4/2011 | Khimji | G01P 5/165 73/861.65 |
| 2012/0100797 A1 | * | 4/2012 | Vogel | F24F 13/1426 454/239 |
| 2013/0061687 A1 | * | 3/2013 | Rath | G01F 15/14 73/861.25 |
| 2013/0166075 A1 | * | 6/2013 | Castillo | F24F 11/30 700/277 |
| 2013/0261808 A1 | * | 10/2013 | Besore | G05D 23/1904 700/278 |
| 2016/0252114 A1 | * | 9/2016 | Moss | F15D 1/02 138/39 |
| 2017/0045389 A1 | * | 2/2017 | Wolgamott | F24F 13/02 |
| 2017/0067765 A1 | * | 3/2017 | Koike | G01F 1/42 |
| 2019/0064132 A1 | * | 2/2019 | Poecher | G01D 1/18 |

FOREIGN PATENT DOCUMENTS

| | | | | |
|---|---|---|---|---|
| GB | 2275115 A | | 8/1994 | |
| GB | 2481214 A | * | 12/2011 | ............... G01F 1/86 |

* cited by examiner

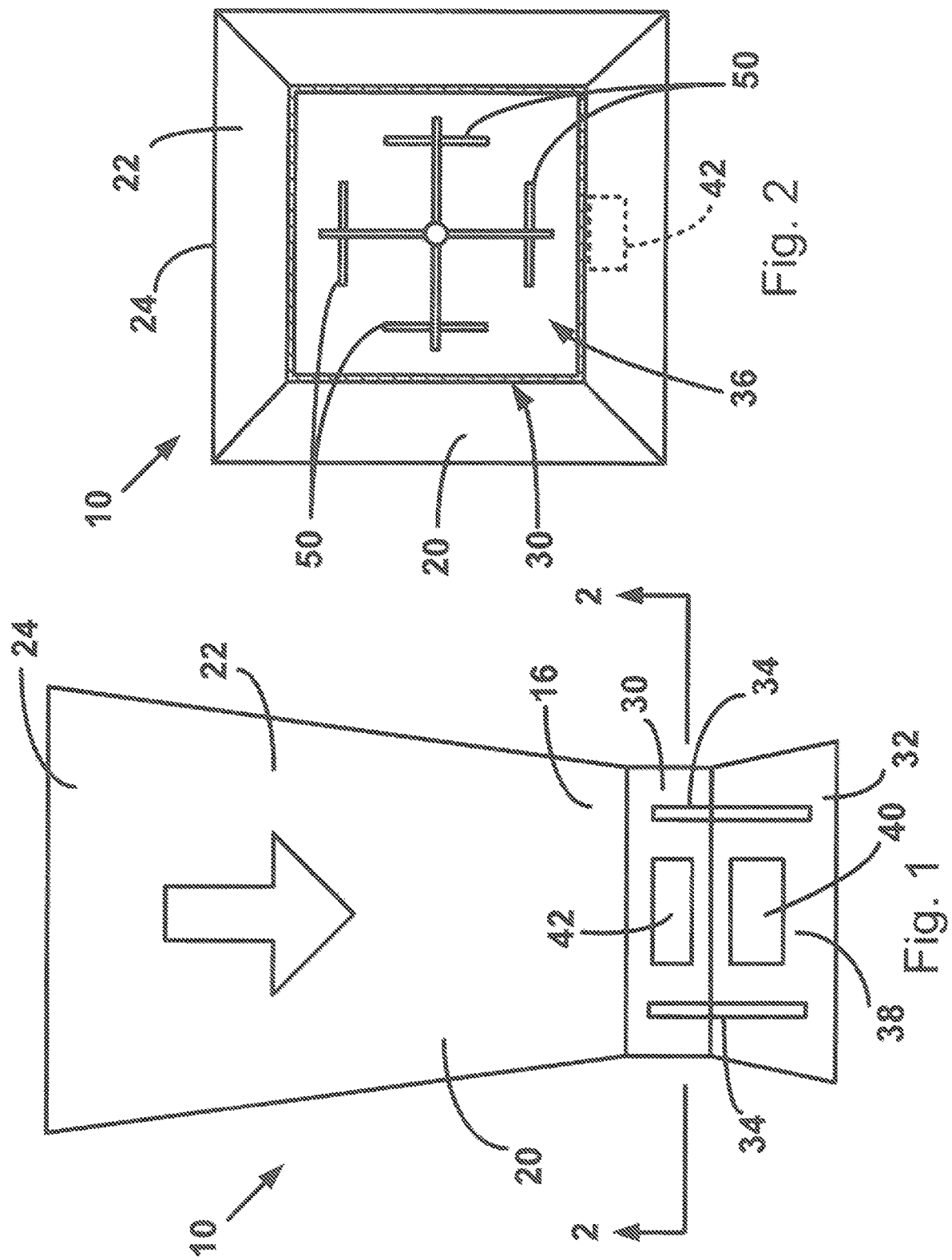

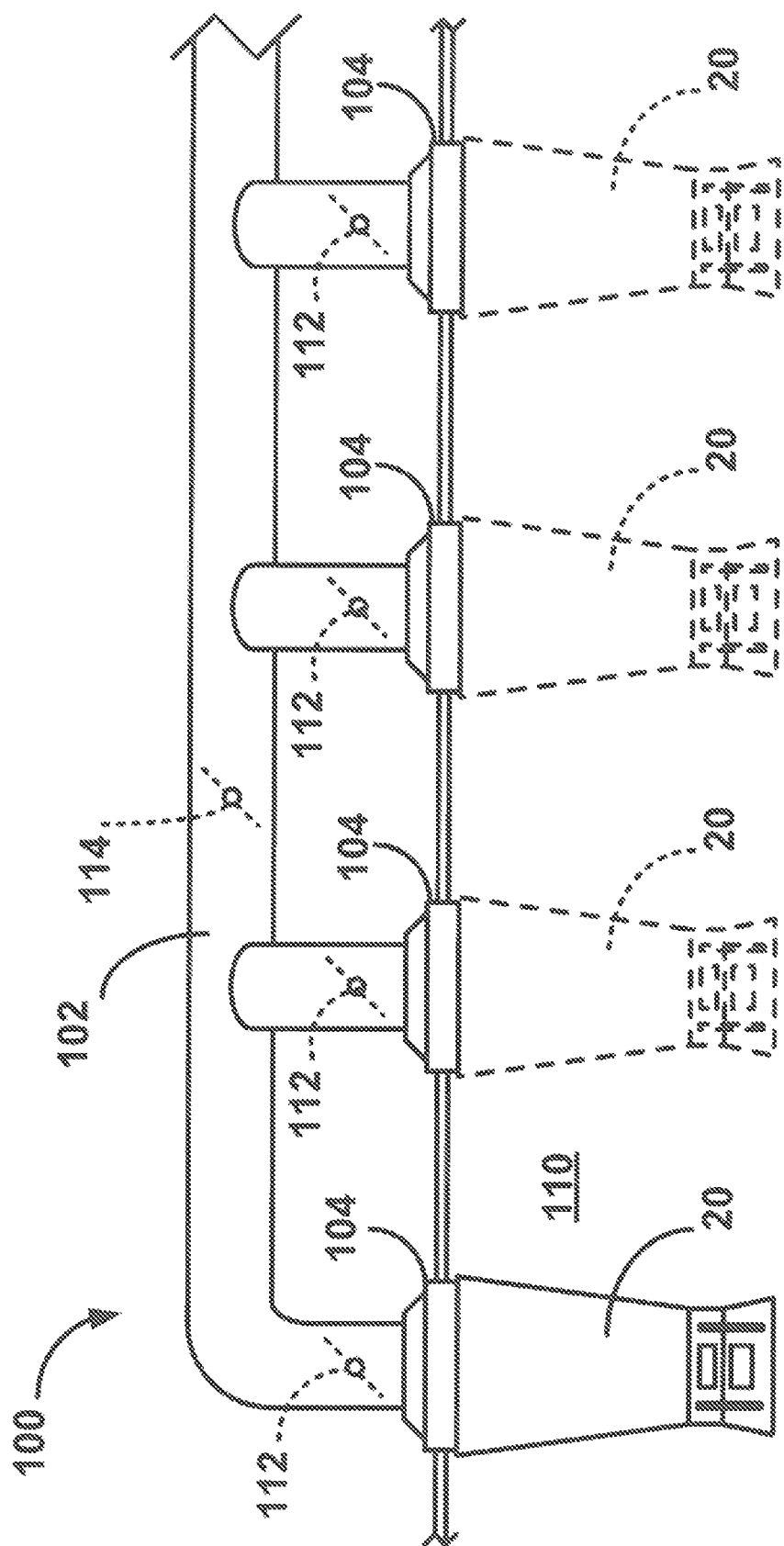

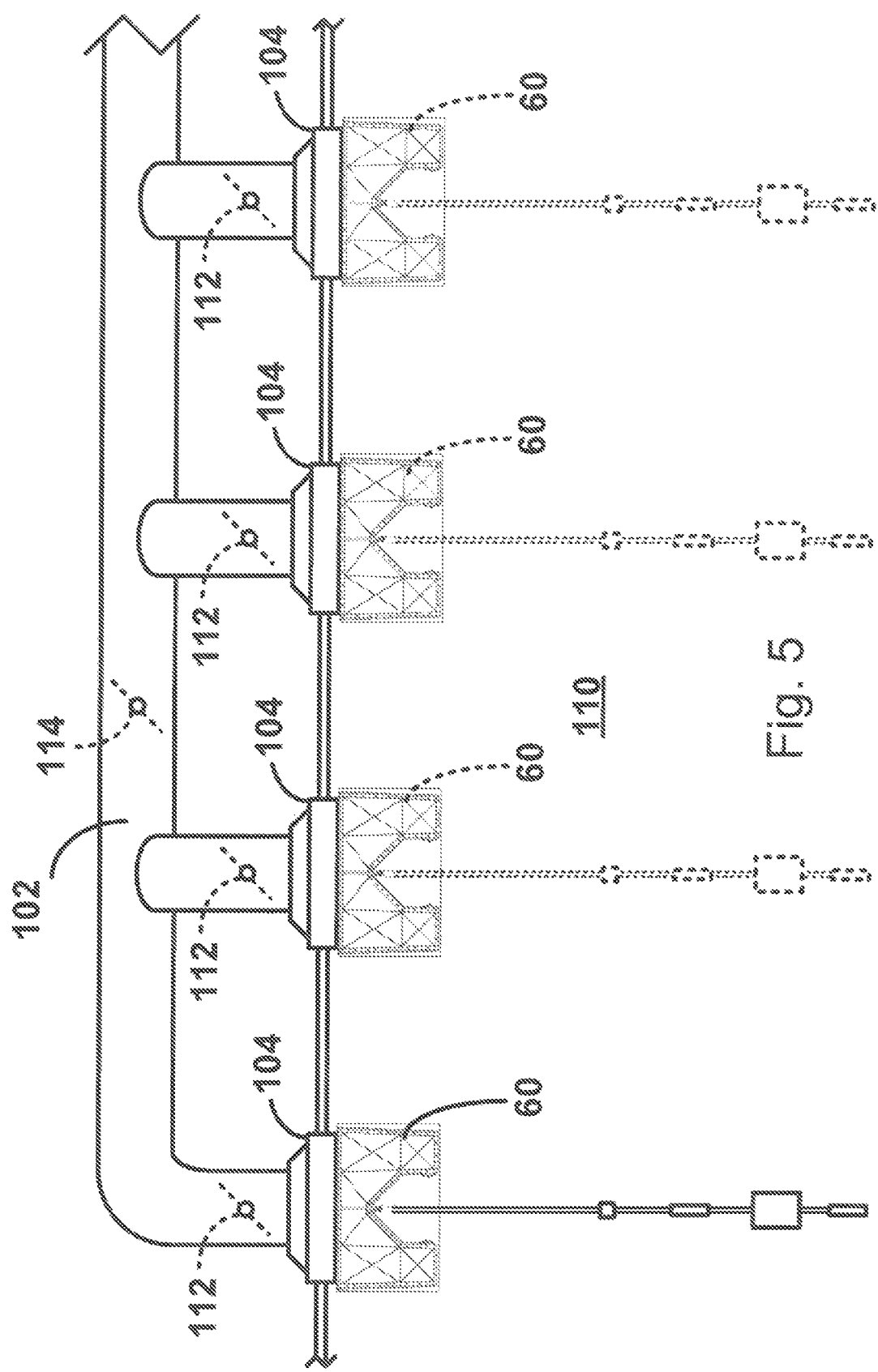

SYSTEM, METHOD, AND APPARATUS FOR BALANCING AN HVAC SYSTEM

TECHNICAL FIELD

The present disclosure is directed generally to air flow sensing. More specifically, the present disclosure is directed to a system, method, and apparatus for balancing diffuser terminals in heating, ventilation, and air conditioning (HVAC) systems in commercial buildings or similar structures.

BACKGROUND

Architects and engineers that design HVAC systems for commercial buildings and other structures go to great lengths to ensure that those systems provide a consistent and reliable level of comfort to the occupants of those structures. HVAC designers carefully size the HVAC units to ensure delivery of the appropriate volume of conditioned air. Additionally, they design the ductwork to distribute the conditioned air to the various rooms and other areas of the structure at adequate volumetric rates. Furthermore, the designers select the spacing and configuration of the diffuser or register terminals through which air flow is discharged (hereafter referred to generally as "terminals") to distribute and disperse the conditioned air into the rooms/areas in a predetermined manner so as to provide the desired level of comfort for the occupants.

Integral to this design is the need for the conditioned air to be dispersed from each terminal at a volumetric flow rate that is at or within a predetermined range of a rate specified by the designer. Flow rates that deviate from those specified by the designers will result in room or area conditions or comfort levels that deviate from the target, which can unnecessarily increase energy costs.

When new commercial HVAC systems are commissioned, the system requires balancing to ensure that the conditioned air is delivered from each terminal at a volumetric flow rate that is at or within a range specified by the system designers. Balancing can also be required as a part of routine HVAC system maintenance or when the floor plan within a building is reconfigured.

Balancing a commercial HVAC system is not a trivial matter and requires the services of a qualified HVAC technician. Commercial HVAC duct runs can be complicated and can have many trunks, branches, or zones, each of which has many terminals, or nodes. Not only does each terminal have its own damper for adjusting flow through that particular node, there are also dampers within the ductwork that can be used to control air flow to the various trunks, branches, and zones within the system. Once one considers that adjusting the flow through any one terminal within the HVAC system will necessarily create a change in backpressure that affects the air flow through all other terminals in the system, the complexity of the balancing task becomes clear.

Ceiling mounted terminals of commercial HVAC systems are selected by the system designer from a finite number of configurations to diffuse and direct conditioned air into the building space in a predetermined pattern. While there are many different terminal configurations from which to choose, a vast majority of the terminal designs fall within or are based around a standard 24-inch by 24-inch footprint common to commercial drop ceiling tiles.

Energy efficiency is one of the most important criteria in the design process of an HVAC system. The goal of an HVAC system is to deliver conditioned air through each terminal in the system at a specified target flow rate that is sufficient to provide suitable comfort levels. Any structure in the system that restricts or otherwise inhibits air flow amounts to a loss that must be accounted for. Dampers and terminals are sources of significant losses in the in HVAC systems. Since terminals have a fixed configuration and structure, they introduce a constant loss, which cannot be overcome. Dampers, however, being adjustable to control flow at each terminal, introduce variable losses that, while significant, can be minimized through proper system balancing.

The losses introduced by dampers increase as the dampers are closed and thereby offer more flow restriction. Therefore, it is ideal not only to balance the HVAC system to achieve the specified flow rates at each terminal, but to do so while having the dampers as open as possible so that losses are at a minimum.

The National Environmental Balancing Board ("NEBB") is an international certification association that, among other functions, certifies individuals and firms to commission, test, adjust, and balance HVAC systems. In addition to certifications, NEBB also provides equipment specifications and procedural standards. On the equipment side, one piece of equipment for which NEBB issues specifications is referred to a direct reading hood, which is used to measure air flow through a ceiling mounted terminal. In this description, the more generic term "air flow hood" is used to describe a most commonly used form of a direct reading hood device. Those skilled in the art will appreciate that "direct reading hood" and "air flow hood," as used in this description, are essentially interchangeable, i.e., the air flow hood described herein can be characterized as a direct reading hood within the NEBB specification.

Air flow hoods are instruments that are used by HVAC technicians to measure the air flow discharged through ceiling mounted terminals of commercial HVAC systems. Air flow hoods are designed to be held in place over the terminal. The hood acts as a duct that collects and redirects the air that is discharged from the terminal. The air flow hood has the configuration of a converging-diverging nozzle with a throat through which the conditioned air is directed in order to measure its volumetric flow rate. Velocity pressure is measured via instrumentation, such as an averaging pitot tube manometer located in the throat, used to calculate flow in a known manner.

HVAC technicians use these measured flows to balance the system by a method referred to in the art as proportional balancing. The basic principle of proportional balancing is that once set, the quantity of airflow from each terminal in a system will always remain in the same ratio or proportion to the other terminals in the system. Although the total quantity of the system changes, terminals will stay in the same percentage-of-flow relationship to each other. Although based on science, traditional proportional balancing relies on the experience of the technician to estimate terminal adjustments that will result in proportional balance.

To proportionally balance a system, initial flows are measured at each terminal. Percent of design flow is calculated for each terminal as the measured flow divided by design flow. The terminal that has the lowest percentage of design flow becomes the key terminal, which is left full open. Terminals are typically balanced in ascending order of percentage of design flow. With experience, however, a technician can balance terminals out of order.

The idea is to set the second terminal so that the percentage of design flow for that terminal and the key terminal are in the correct proportions. Once their percentages are in the correct proportions, they remain in the correct proportions. Although the airflow through these proportionally balanced terminals can and will fluctuate as other terminals are balanced, their percentage proportions will remain the same. To accomplish this, the second terminal is initially set based upon the knowledge and experience of the technician. In other words, it is an educated guess on the part of the technician. Flows at the second terminal and key terminal are re-measured to determine whether their percentage of design flows are within a predetermined tolerance. Once they are within this tolerance, the technician moves to the next terminal.

The process is repeated for each terminal in the system. The technician uses his knowledge to estimate the adjustment to each terminal so that it will result in its percentage of design flow being equal to the key and the other previously balanced terminals. Due to the reliance on the technician's estimation skills, adjusting, re-measuring, and repeating are frequent and common. Additionally, as the technician performs these balancing tasks, he also uses his knowledge and experience to estimate adjustments so that adjusting the final terminal will bring the percentage of design flow for that terminal and all others to not only be equal, but also as close to 100% as possible. Once accomplished, the technician adjusts fan speed, if necessary, to achieve 100% design flow for the terminals.

From the above, those skilled in the art will appreciate that traditional proportional balancing methods are inexact, time consuming, and prone to errors requiring re-adjustments. The system, method, and apparatus of the present invention eliminates this guesswork by systematically and scientifically determining set points for each terminal using mass flow theory, so that each terminal is set to a position that will result in system balance once the last terminal in the system is set.

SUMMARY

According to one aspect, a method for balancing terminals of an HVAC system using an air flow measuring device includes inputting into a computer processing portion of the air flow measuring device predetermined target flows for each terminal. The method also includes acquiring via the air flow measuring device initially measured air flows through each of the terminals, the initially measured air flows being provided to the computer processing portion. The method further includes adjusting the terminals in the HVAC system to flow set points according to instructions from the computer processing portion, the computer processing portion being programmed to calculate the flow set point for each terminal given current HVAC system load conditions, that will result in all terminals being set to target flow after all terminals have been adjusted as instructed.

According to another aspect, alone or in combination with any of the preceding aspects, adjusting the terminals can include positioning the air flow measuring at a terminal under adjustment as instructed by the computer processing portion. The computer processing portion can be programmed to identify the order in which the terminals of the HVAC system are adjusted. The method can also include obtaining the flow set point for the terminal under adjustment from the computer processing portion and adjusting the terminal under adjustment to the flow set point.

According to another aspect, alone or in combination with any of the preceding aspects, the computer processing portion can be programmed to determine the current HVAC system load conditions used to determine the flow set point for a terminal under adjustment as a function of the initially measured air flows and the predetermined target flows for the terminals.

According to another aspect, alone or in combination with any of the preceding aspects, the computer processing portion can be programmed to determine the current HVAC system load conditions used to determine the flow set point for the terminal under adjustment further as a function of air flows resulting from adjustments to other terminals of the HVAC system.

According to another aspect, alone or in combination with any of the preceding aspects, the computer processing portion can be programmed to calculate the air flows resulting from adjustments to other terminals of the HVAC system.

According to another aspect, alone or in combination with any of the preceding aspects, the computer processing portion can be programmed to calculate the air flows resulting from adjustments to other terminals of the HVAC system as a function of a resulting air flow measured at a terminal other than the terminal under adjustment.

According to another aspect, alone or in combination with any of the preceding aspects, after adjusting the terminal under adjustment, the computer processing portion can be programmed to instruct the user to use the air flow measuring device to acquire a measured air flow through a different terminal. The computer processing portion can be further programmed to calculate a predicted flow through the different terminal and compare the measured flow through the different terminal to the predicted flow through the different terminal to determine an error. In response to the error exceeding a predetermined threshold, the computer processing portion can be further programmed to recalculate the flow set point for the terminal under adjustment and instruct the user to re-adjust the terminal under adjustment to the recalculated flow set point.

According to another aspect, alone or in combination with any of the preceding aspects, to determine the recalculated the flow set point for the terminal under adjustment, the computer processing portion can be programmed to calculate a revised total flow as a function of a total flow determined prior to setting the terminal under adjustment and the error. The computer processing portion can also be programmed to calculate flow ratios for each terminal as a function of the predicted flow for each terminal and the total flow determined prior to setting the terminal under adjustment. The computer processing portion can be further programmed to calculate revised predicted flows through each terminal as a function of the flow ratios and the revised total flow, and determine a recalculated flow set point as a function of the revised total flow and the revised predicted flows.

According to another aspect, alone or in combination with any of the preceding aspects, after adjusting the terminal under adjustment, the computer processing portion can be programmed to instruct the user to move the air flow measuring device to the next terminal in the identified order. The computer processing portion can also be programmed to calculate a predicted air flow through the next terminal; measure the air flow through the next terminal; compare the predicted air flow through the next terminal to the measured air flow through the next terminal to determine an error; calculate a flow set point for the next terminal as a function of the error; and instruct the user to adjust the next terminal to the recalculated flow set point.

According to another aspect, alone or in combination with any of the preceding aspects, to calculate the flow set point for the next terminal, the computer processing portion can be programmed to calculate a revised total flow as a function of a total flow determined prior to setting the terminal under adjustment and the error. The computer processing portion can also be programmed to calculate flow ratios for each terminal as a function of the predicted flow for each terminal and the total flow determined prior to setting the terminal under adjustment. The computer processing portion can also be programmed to calculate revised predicted flows through each terminal as a function of the flow ratios and the revised total flow. The computer processing portion can further be programmed to determine a recalculated flow set point as a function of the revised total flow and the revised predicted flows.

According to another aspect, alone or in combination with any of the preceding aspects, adjusting the terminal to the flow set point can include adjusting flow through the terminal while using the air flow measuring device to monitor the flow through the terminal to determine when the flow set point has been reached.

According to another aspect, alone or in combination with any of the preceding aspects, the instructions can include instructing the user to place all dampers to all terminals in the HVAC system to a fully open condition prior to measuring any initial flows.

According to another aspect, alone or in combination with any of the preceding aspects, the computer processing portion can be programmed to identify a key terminal in the HVAC system. The instructions can include instructing the user to leave the key terminal fully opened throughout the balancing process.

According to another aspect, alone or in combination with any of the preceding aspects, the computer processing portion can be programmed to determine a terminal error for each terminal in the HVAC system as a function of the ratio of a target flow and the initially measured flow for each respective terminal, and identify the terminal with the lowest terminal error as the key terminal.

According to another aspect, alone or in combination with any of the preceding aspects, the computer processing portion can be programmed to identify the terminals to adjust in ascending order of magnitude of the terminal error.

According to another aspect, alone or in combination with any of the preceding aspects, the computer processing portion can be programmed to solve for set points $Q_{is}$ and $Q_{Ns}$ calculations as:

$$Q_{s_i} = \frac{Q_T}{1 + \left(\frac{Q_{f_1}}{Q_1 Q_{f_i}} \cdot \left[\left(\sum_{a=1}^{i-1} \frac{Q_1 Q_{f_a}}{Q_{f_1}}\right) + \left(\sum_{b=i+1}^{N} Q_b\right)\right]\right)}; \text{ and}$$

$$Q_{s_N} = \frac{Q_T}{1 + \left(\frac{Q_{f_1}}{Q_1 Q_{f_N}} \cdot \left[\left(\sum_{c=1}^{N-1} \frac{Q_1 Q_{f_c}}{Q_{f_1}}\right)\right]\right)};$$

where $Q_T$ is the total system flow;
$Q_b$ and $Q_1$ are the initial flows for terminals $i+1 \leq b \leq N$, and 1; and
where $Q_{f_i}$, $Q_{f_a}$, $Q_{f_c}$ and $Q_{f_i}$ are the target flows for terminals 1, $1 \leq a \leq i-1$, $1 \leq c \leq N-1$, and i, respectively.

According to another aspect, alone or in combination with any of the preceding aspects, the computer processing portion can be programmed to solve for the predicted flow $Q_{P_1}$, $Q_{P_x}$, $Q_{P_z}$ and $Q_{P_N}$ in terminals 1, $2 \leq x \leq i-1$, $i+1 \leq z \leq N-1$ and N as a result of setting terminal i according to:

$$Q_{P_1} = \frac{Q_T}{1 + \left(\frac{1}{Q_1} \cdot \left[\left(\sum_{d=2}^{i} \frac{Q_1 Q_{f_d}}{Q_{f_1}}\right) + \left(\sum_{c=i+1}^{N} Q_c\right)\right]\right)};$$

$$Q_{P_x} = \frac{Q_T}{1 + \left(\frac{Q_{f_1}}{Q_1 Q_{f_x}} \cdot \left[\left(\sum_{e=2}^{i-2} \frac{Q_1 Q_{f_e}}{Q_{f_1}}\right) + \frac{Q_1 Q_{f_i}}{Q_{f_1}} + \left(\sum_{c=i+1}^{N} Q_c\right)\right]\right)};$$

$$Q_{P_z} = \frac{Q_T}{1 + \left(\frac{1}{Q_z} \cdot \left[\left(\sum_{v=1}^{i} \frac{Q_1 Q_{f_v}}{Q_{f_1}}\right) + \left(\sum_{w=i+2}^{N} Q_w\right)\right]\right)}; \text{ and}$$

$$Q_{P_N} = \frac{Q_T}{1 + \left(\frac{1}{Q_N} \cdot \left[\left(\sum_{v=1}^{i} \frac{Q_1 Q_{f_v}}{Q_{f_1}}\right) + \left(\sum_{w=i+1}^{N-1} Q_z\right)\right]\right)};$$

where $Q_T$ is the total system flow;
where $Q_c$, $Q_w$, $Q_N$ and $Q_z$ are the initial flows for terminals $i+1 \leq c \leq N$, $i+2 \leq w \leq N$, $i+1 \leq z \leq N-1$, N; and
where $Q_{f_i}$, $Q_{f_x}$, $Q_{f_d}$, $Q_{f_i}$, $Q_{f_v}$ and $Q_{f_e}$ are the target flows for terminal 1, $2 \leq x \leq i-1$, $2 \leq d \leq i$, i, $1 \leq v \leq i$, and $1 \leq e \leq i-2$, respectively.

According to another aspect, alone or in combination with any preceding aspect, an apparatus for measuring air flow in an HVAC system can include structure configured to be placed in the air flow path of a terminal of the HVAC system. The structure can be further adapted to direct air flow from the terminal through the structure. The apparatus can also include instrumentation supported by the structure and having portions positioned in the air flow path. The instrumentation can be configured to generate signals related to the air flow through the structure. The apparatus can further include electronics operatively connected to the instrumentation and adapted to receive the signals related to air flow and transform those signals to computer readable data. The electronics can include a computer processing portion programmed to use the computer readable data to determine measured air flows through the structure. The computer processing portion can be further programmed to calculate for a terminal under adjustment a flow set point, the flow set point being the air flow through the terminal under adjustment that, under current system conditions, will result in balanced system flow when all other terminals in the system are in balance.

According to another aspect, alone or in combination with any of the preceding aspects, the computer processing portion can be programmed to calculate the flow set point as a function of measured air flows and predetermined target air flows for all of the terminals in the HVAC system.

According to another aspect, alone or in combination with any of the preceding aspects, the electronics can include a user interface for receiving user input data and for displaying system data. The user interface can be operatively connected to the computer processing portion so as to receive the user input data from the user interface and to send data to the user interface for display.

According to another aspect, alone or in combination with any of the preceding aspects, the electronics can be configured so that the user can input data regarding the system to the computer processing portion via the user interface, and the computer processing portion can provide instructions to the user via the user interface.

According to another aspect, alone or in combination with any of the preceding aspects, the computer processing portion can be further programmed to calculate a predicted flow through each terminal as a function of the measured flow through each terminal. The computer processing portion can be further programmed to determine whether a difference between the predicted flow for a terminal different than the terminal under adjustment and a secondary measured flow through that different terminal exceeds a predetermined threshold. In response to the difference exceeding the predetermined threshold, the computer processing portion can be programmed to determine a recalculated flow set point for the terminal under adjustment.

According to another aspect, alone or in combination with any of the preceding aspects, the computer processing portion can be further programmed to prompt the user to adjust the terminal under adjustment to the flow set point and monitor air flow through the terminal under adjustment to determine when the flow set point is reached.

According to another aspect, alone or in combination with any of the preceding aspects, an apparatus for measuring air flow in an HVAC system can include an air flow hood configured to measure air flow from a terminal of the HVAC system, and electronics configured to communicate with the air flow hood to receive air flow measurements, the electronics comprising a computer processing portion operatively connected to a user interface portion. The computer processing portion can be programmed to query a user for data, provide instructions to the user, and receive data from by the user via the user interface. The computer processing portion can also be programmed to query the user for, and receive from the user, data relating to the HVAC system. The information can include the number of terminals in the HVAC system and predetermined desired air flow rates for each terminal. The computer processing portion can also be programmed to instruct the user to obtain via the air flow hood an initial measured air flow for each terminal in the HVAC system, and to instruct the user to adjust the air flow rates of the terminals in the HVAC system to set points calculated to balance the HVAC system.

According to another aspect, alone or in combination with any of the preceding aspects, to instruct the user to adjust the air flow rates, for each terminal in the system that requires adjusting, the computer processing portion can be programmed to instruct user to adjust the terminal under adjustment to the calculated set point and use the air flow hood to measure the air flow through a terminal different than the terminal under adjustment in order to determine the impact that adjusting the terminal under adjustment had on the HVAC system. The computer processing portion can programmed to readjust the terminal under adjustment to a recalculated set point in response to determining that the impact on the HVAC system exceeded a predetermined value.

According to another aspect, alone or in combination with any of the preceding aspects, the computer processing portion can be programmed to calculate the flow set point as a function of measured air flows and predetermined target air flows for all of the terminals in the HVAC system.

According to another aspect, alone or in combination with any of the preceding aspects, to determine the recalculated the flow set point, the computer processing portion can be programmed to calculate a predicted flow for each terminal and determine for the different terminal an error between the predicted flow and the secondary measured flow. The computer processing portion can also be programmed to calculate a revised total flow as a function of the error and a total flow determined from the initially measured air flows. The computer processing portion can also be programmed to calculate flow ratios for each terminal as a function of the predicted flow for each terminal and the total flow determined prior to setting the terminal under adjustment. The computer processing portion can further be programmed to calculate revised predicted flows through each terminal as a function of the flow ratios and the revised total flow, and determine a recalculated flow set point as a function of the revised total flow and the revised predicted flows.

BRIEF DESCRIPTION OF THE DRAWINGS

The present invention is illustrated by way of example and not limitation in the figures of the accompanying drawings, in which like references indicate similar elements and in which:

FIG. 1 is a front elevation view of an air flow hood that can be implemented in a system for measuring air flow, according to the invention.

FIG. 2 is a sectional view of the air flow hood taken generally along line 2-2 in FIG. 1.

FIG. 3 is a schematic view illustrating the air flow hood of FIGS. 1 and 2 being used to measure air flow through terminals of an HVAC system.

FIG. 5 is a schematic view illustrating the air flow hood of FIG. 4 being used to measure air flow through terminals of an HVAC system.

DESCRIPTION

Figure 4:
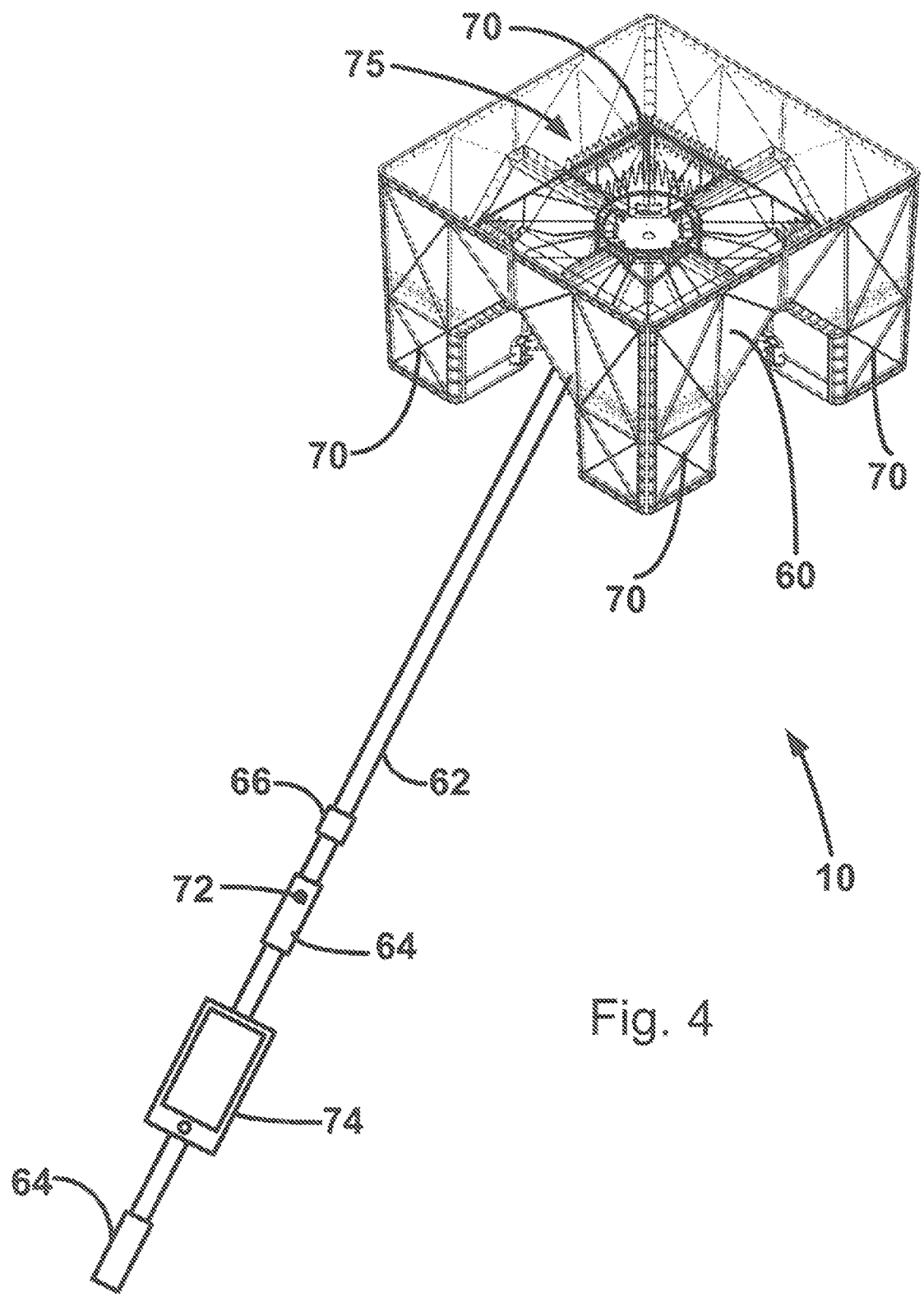
FIG. 4 is a perspective view of another air flow hood that can be implemented in a system for measuring air flow, according to the invention.
Figure 6A:
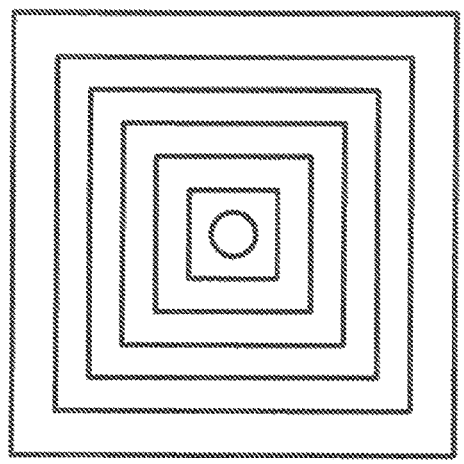
FIGS. 6A-6J illustrate examples of HVAC terminals, the air flow through which the system of FIGS. 1-5 can be used to measure.
Figure 6B:
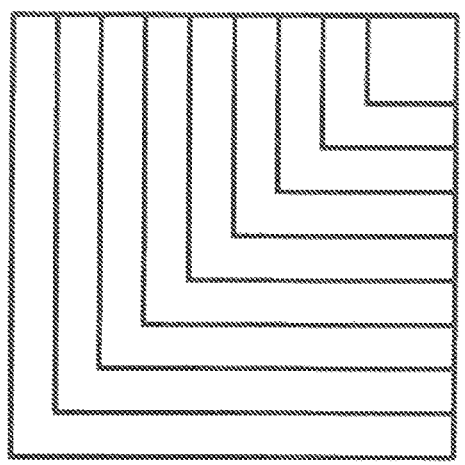
Figure 6C:
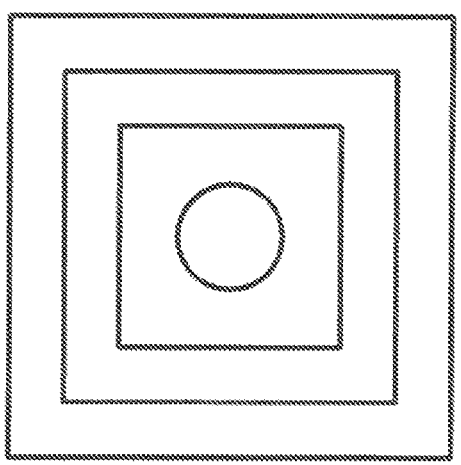
Figure 6D:
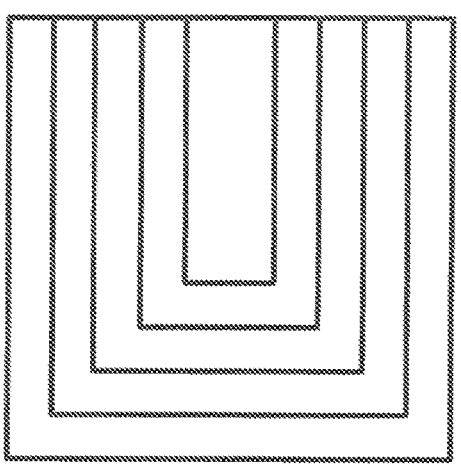
Figure 6E:
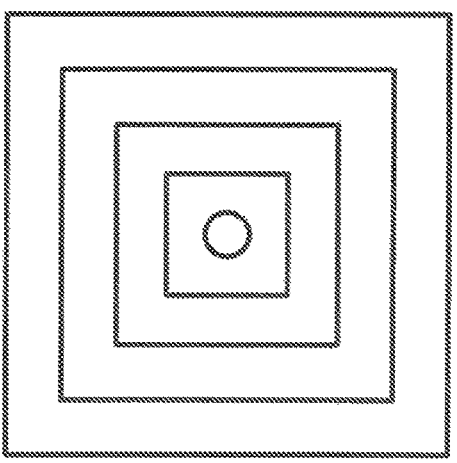
Figure 6F:
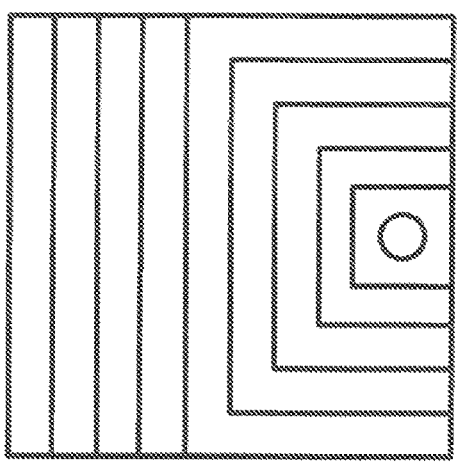
Figure 6H:
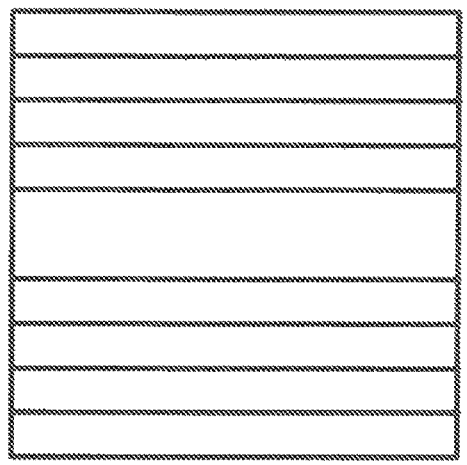
Figure 6J:
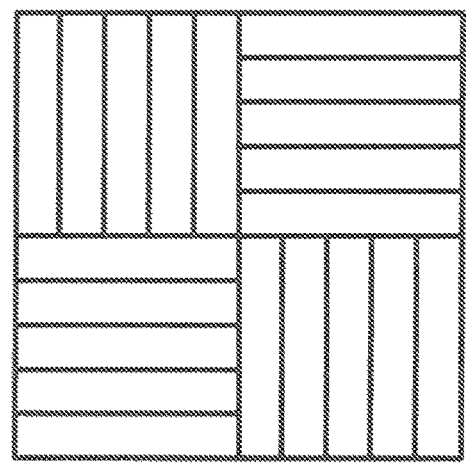
Figure 6G:
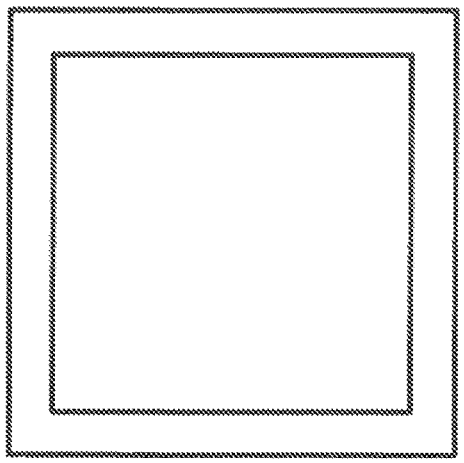
Figure 6I:
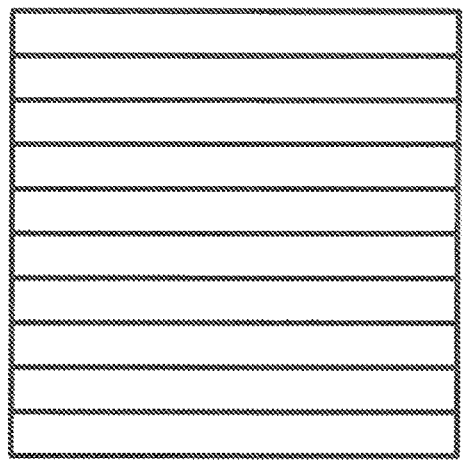

The present invention relates to systems and methods for determining air flow in an HVAC system. More particularly, the invention relates to a method for balancing HVAC systems so that air flow through each terminal in the system discharges conditioned air at the flow rates dictated by design specifications. The method can be implemented on a variety of air flow measuring systems.

One system in which the air flow balancing systems and methods of the invention can be implemented is illustrated in FIGS. 1 and 2. FIGS. 1 and 2 illustrate an example configuration of a system 10 for measuring air flow through a terminal in an HVAC system. The system 10 includes an air flow measuring apparatus 20 in the form of an air flow hood that is used to measure air flow. The air flow hood 20 of FIGS. 1 and 2 is a common design that is commonly used to measure air flow through terminals in a building HVAC system that discharge conditioned air into the conditioned space of the building. The most common use of the air flow hood 20 is to aid an HVAC technician in "balancing" the drop-ceiling mounted terminals of the HVAC system so that the conditioned air is distributed in the building in accordance with specifications laid out by the HVAC engineer or architect. Balancing terminals in these systems requires accurate measurements of the air flow through each terminal. The systems and methods of the invention improve the accuracy of these measurements by providing backpressure compensated measurements.

Because of the focused and specialized purpose of the air flow hood 20, it can be configured to cooperate with standard HVAC through which air flow is measured. The air flow hood 20 includes a collection hood 22 that is configured to capture air discharged through a standard HVAC terminal, which has a 24"×24" footprint. The collection hood 22 has a generally trapezoidal profile with a square cross section, and is dimensioned so that an open end 24 of the collection hood fits over the standard 24"×24" terminal in a manner sufficient to collect all or substantially all of the air discharged from the terminal.

The collection hood 22 tapers down from the open end 24 to an instrument end 16 where the collection hood meets and is connected with an instrumentation housing 30. The instrumentation housing 30 includes a trapezoidal lower portion that defines an outlet 32 of the air flow hood 20. The air flow hood 20 thus has the general form of a converging-diverging nozzle. Air flow through the hood 20 can therefore be determined on the basis of well-established fluid dynamic principles regarding the relationship between total and static pressure measurements in order to calculate the velocity pressure and flow velocity, and therefore, flow rate.

The instrumentation housing 30 includes handles 34 for supporting and maneuvering the air flow hood 20 into position over a terminal. The housing 30 houses instrumentation 36 for measuring the air flow through the air flow hood 20. The housing 30 also houses electronics 38 of the air flow hood 20 that are operatively connected to the instrumentation 36 and that interrogate and receive information from the instrumentation. The electronics 38 include a user interface 40 that can include features, such as input devices, such as knobs, buttons, switches, touch screens, etc., and output devices, such as a visual meter, display screen, LED readout, etc., that are used to operate the air flow hood 20.

The computer processing portion 42 that executes the processes described herein can include a programmable processor, such as a computer or an application specific integrated circuit (ASIC), and computer readable memory upon which computer programs and data can be stored for access by the processor. The computer readable memory can include all forms of non volatile memory, such as semiconductor memory devices (e.g., EPROM, EEPROM, and flash memory devices), magnetic disks (e.g., internal hard disks or removable disks; magneto optical disks; and CD ROM and DVD-ROM disks). The computer processing portion 42 can include or can interface with special purpose circuitry for interfacing the instrumentation 36. The computer processing portion 42 can be integrated with any other portion of the electronics 38, such as the user interface 40, or can stand alone as a separate component that interfaces other electronic components.

In one particular embodiment, the electronics 38 can include a wireless communications module, such as a Bluetooth, single mode wireless connectivity module, or wi-fi network device for transmitting wirelessly the measurement data obtained from the instrumentation 36. In this instance, the user interface 40 and computer processing portion 42 can comprise a smart device, such as a smart phone, tablet, or other suitably equipped electronic device. In this embodiment, the smart device can include an HVAC balancing app that executes the balancing processes described herein.

Referring to FIG. 2, in the example embodiment, the instrumentation 36 includes an array of pitot tubes 50 for measuring velocity pressure within the air flow hood 20. As known in the art, the pitot tubes 50 have apertures presented both toward and away from the air flow direction in the hood 20, which is indicated generally by the arrow labeled A in FIG. 1. The difference between total and static pressures measured via the pitot tubes 50 can be used to calculate the air flow through the hood 20 in a known manner.

The air flow hood 20 is illustrative of an apparatus that can be implemented in the system 10 to measure air flow. The systems and methods for system balancing disclosed herein are not by any means limited to this or any other particular configuration. The systems and methods for system balancing that are described herein are applicable to any hood or other device that is capable of measuring air flow through a terminal in an HVAC system.

For example, referring to FIG. 4, the system 10 can include an apparatus 60 in the form of an air flow hood that is used to measure air flow. The air flow hood illustrated in FIG. 4 can, for example, be similar or identical to that which is described in U.S. Provisional Application Ser. No. 62/121,222 filed on Feb. 26, 2015, which is hereby incorporated by reference in its entirety.

As shown in FIG. 4, the system 10 includes an air flow hood 60 that is used to measure air flow through a terminal in an HVAC system. The air flow hood 60 has a generally boxed configuration that is sized and proportioned to fit over the standard 24"×24" terminal. In this embodiment, the air flow hood 60 is divided into quadrants 70 through which the air flow is directed. Within each quadrant 70 is located instrumentation for measuring the air flow through that particular quadrant. The instrumentation can, for example, be in the form of a hot point anemometer or a pitot-static tube array. Total flow through the air flow hood 60 is the calculated sum of the flows through the quadrants 70.

The air flow hood 60 is supported on a pole 62 that facilitates a user to maneuver the air flow hood 60 to fit squarely over the terminal so that all or substantially all of the air discharged from the terminal is directed through the hood 60. The pole 62 can include handles 64 for facilitating a comfortable and ergonomic feel while maneuvering and using the air flow hood 60. The pole 60 can have a telescoping construction with a locking ring 66 that facilitates locking the pole at the desired length. With the air flow hood 60 positioned over the terminal so that the air is directed through the hood quadrants 70, the user can activate the system 10, for example, via a button or trigger 72 on one of the handles 64.

The trigger 72 activates instrumentation and electronics of the air flow hood 60 via wireless communications, such as Bluetooth or single mode wireless connectivity. The instrumentation and electronics are at least partially hidden within the air flow hood 60 and therefore indicated generally by the arrow at 75 in FIG. 4. The instrumentation and electronics 75 obtains air flow measurement data that is transmitted wirelessly (again, e.g., via Bluetooth or wi-fi) to a computer processing portion of the air flow hood 60 in the form of a smart device 74, such as a smart phone, tablet, or other suitably equipped electronic device that can be removably mounted to the pole 62.

The smart device 74 is equipped with an application ("HVAC app") that is adapted to use the measurement data received from the instrumentation and electronics 75 of the air flow hood 60 to calculate or otherwise determine the volumetric flow rate of the air discharged from the HVAC terminal. Through the HVAC app loaded on the smart device 74, which communicates wirelessly with the instrumentation and electronics 75 on the air flow hood 60, the methods described herein can be implemented to calculate or otherwise determine the terminal settings used to balance the HVAC system.

Regardless of whether the air flow measurement system 10 utilizes the air flow hood 20 of FIGS. 1 and 2, the air flow hood 60 of FIG. 4, or an air flow hood having a configuration that differs from those illustrated in FIGS. 1, 2, and 4, the process for obtaining the air flow measurements is essentially the same.

The air flow measurement process for a system 10 utilizing the air flow hood 20 of FIGS. 1 and 2 is illustrated by way of example in FIG. 3. Referring to FIG. 3, an HVAC system 100 includes ductwork 102 that distributes HVAC conditioned air and delivers the conditioned air through terminals 104 into a space or zone 110, such as a room in a building. In the illustration of FIG. 3, there are four terminals 104 that deliver conditioned air into the zone 110. Each terminal 104 can have an associated damper 112 for adjusting flow by changing the angle of attack of the damper. Additional dampers 114 can be used to control flow within the ductwork 102. The number of terminals 104 associated with any given zone could, of course, be greater or fewer.

To obtain an air flow measurement for a terminal 104, the air flow hood 20 is positioned over the terminal, and the instrumentation 36 and electronics 38 (see FIGS. 1 and 2) are activated via the user interface 40. Once the readings for the terminal 104 are taken, the air flow hood 20 is moved to the next terminal (shown in dashed lines at 20'), where the hood is activated and readings are taken in the same manner. This process is repeated for all of the terminals 104 in the zone 110.

The measurement process for a system 10 utilizing the air flow hood 60 of FIG. 4 is similar and is illustrated by way of example in FIG. 5. Referring to FIG. 5, an HVAC system 100 includes ductwork 102 that distributes HVAC conditioned air and delivers the conditioned air through terminals 104 into a space or zone 110, such as a room in a building. In the illustration of FIG. 5, there are four terminals 104 that deliver conditioned air into the zone 110. Each terminal 104 can have an associated damper 112 for adjusting flow through the damper. Additional dampers 114 can be used to control flow within the ductwork 102. The number of terminals 104 associated with any given zone could, of course, be greater or fewer.

To obtain an air flow measurement for a terminal 104, the air flow hood 60 is positioned over the terminal and the instrumentation and electronics are activated via the trigger 72, causing readings to be taken and data to be transmitted to the smart device 74 (see FIG. 4), where the HVAC App can use the data to perform calculations. Once the readings for the terminal 104 are taken, the air flow hood 60 is moved to the next terminal (shown in dashed lines at 60'), where the hood is activated and readings are taken in the same manner. This process is repeated for all of the terminals 104 in the zone 110.

Conventional commercial HVAC ceiling mounted terminals can have a variety of configurations. Examples of these terminal configurations are illustrated in FIGS. 6A-6J, which show the basic layout of the terminals and the directions in which air is discharged (indicated generally by arrows). These example terminal configurations are summarized in the following table:

| FIG. | Terminal Configuration |
| --- | --- |
| 6A | 3-Cone, Square, 4-Way Terminal (104a) |
| 6B | 2-Cone, Square, 4-Way Terminal (104b) |
| 6C | 5-Cone, Square, 4-Way Terminal (104c) |
| 6D | 3-Way, Square Terminal (104d) |
| 6E | 3-Way, Rectangular Terminal (104e) |
| 6F | 2-Way, Square Terminal (104f) |
| 6G | T-Bar, Square, Plate Terminal (104g) |
| 6H | 2-Way Terminal (104h) |
| 6I | 1-Way Terminal (104i) |
| 6J | 4-Way, Modular Terminal (104j) |

Each terminal configuration redirects or otherwise disturbs the air flow through its structure and therefore introduces into the HVAC system a certain amount of air flow resistance or backpressure. Additionally, placing an air flow hood over the terminal also affects air flow through the terminal, as the hood itself can introduce a certain amount of resistance into the HVAC system. From this, it can be appreciated that the amount of resistance introduced by the presence of an air flow hood can vary, depending on the configuration of the terminal over which the hood is positioned. The amount of resistance for different combinations of terminal and air flow hood configurations can vary widely. Since, however, the terminal configuration introduces a constant amount of resistance that cannot be changed, the only variable source of resistance is that introduced by the air flow hood.

Predictive Balancing Method

According to the invention, the air flow measuring system 10 implements a method or algorithm for balancing terminals in an HVAC system. For the air flow hood 20 of FIGS. 1-3, the predictive balancing method can be implemented in the computer processing portion 42 of the electronics 38. For the air flow hood 60 of FIGS. 4 and 5, the predictive balancing method can be implemented in the HVAC App executed by the smart device 74.

According to the predictive balancing method, each terminal in the HVAC system, or a portion/branch of the system, is set or adjusted sequentially so that the flow through each terminal becomes balanced when flow through the last terminal is adjusted. Setting each terminal brings the system incrementally closer to balance, with full balance being achieved with setting the last terminal. In this description, when "setting" or "adjusting" a terminal is described, it is meant that the damper for controlling air flow through the terminal is adjusted while air flow discharged from the terminal is monitored via the air flow hood 20, 60.

The predictive balancing method implemented by air flow measuring system 10 uses calculations based on mass flow theory to determine flow set points for each terminal that will result in system balance upon setting the last terminal in the system. Essentially, having measured the flow at each terminal, the method includes determining initial flow error ratios for each terminal and correcting those errors systematically and sequentially, from terminal to terminal, until the system as a whole is brought into balance. Depending on the desired level of precision, the method can take into account the impact that adjusting each terminal will have on the total system flow and correct or compensate the terminal adjustments based on these determined impacts.

The predictive balancing method implemented by the system 10 calculates flow set points for each terminal so that the flow rate to which the terminal is adjusted under current system conditions will result in the specified target air flow through that terminal once all others have been similarly adjusted. Knowing the design specified target air flow for each terminal, the flow through each terminal in the current state of the system, and total system flow under the current state, the predictive balancing method calculates adjustments to each terminal based on the impact that the terminal, if adjusted correctly, would have on the current state of the system. Once a terminal is adjusted, the resulting system conditions can be estimated or determined, either mathematically or through one or more subsequent measurements, and those resulting system conditions can be used to calculate the set point for the next terminal in the sequence.

Adjusting the terminals one by one in a predetermined sequence, the HVAC system is systematically and incrementally brought into balance. The adjustment to each terminal reduces the error for all other terminals and therefore brings all terminals incrementally closer to design specifications. The adjustment to the last damper in the sequence brings all errors close to or equal to zero, and all terminals are adjusted to specification. Of course, there can be some tolerance for error here, but those values can be very low, such as less than 10%, 5%, 2%, 1% or even less than 0.5% or lower, depending, for example, on the selected balancing mode.

Predictive Balancing Equations

Figure 7A:
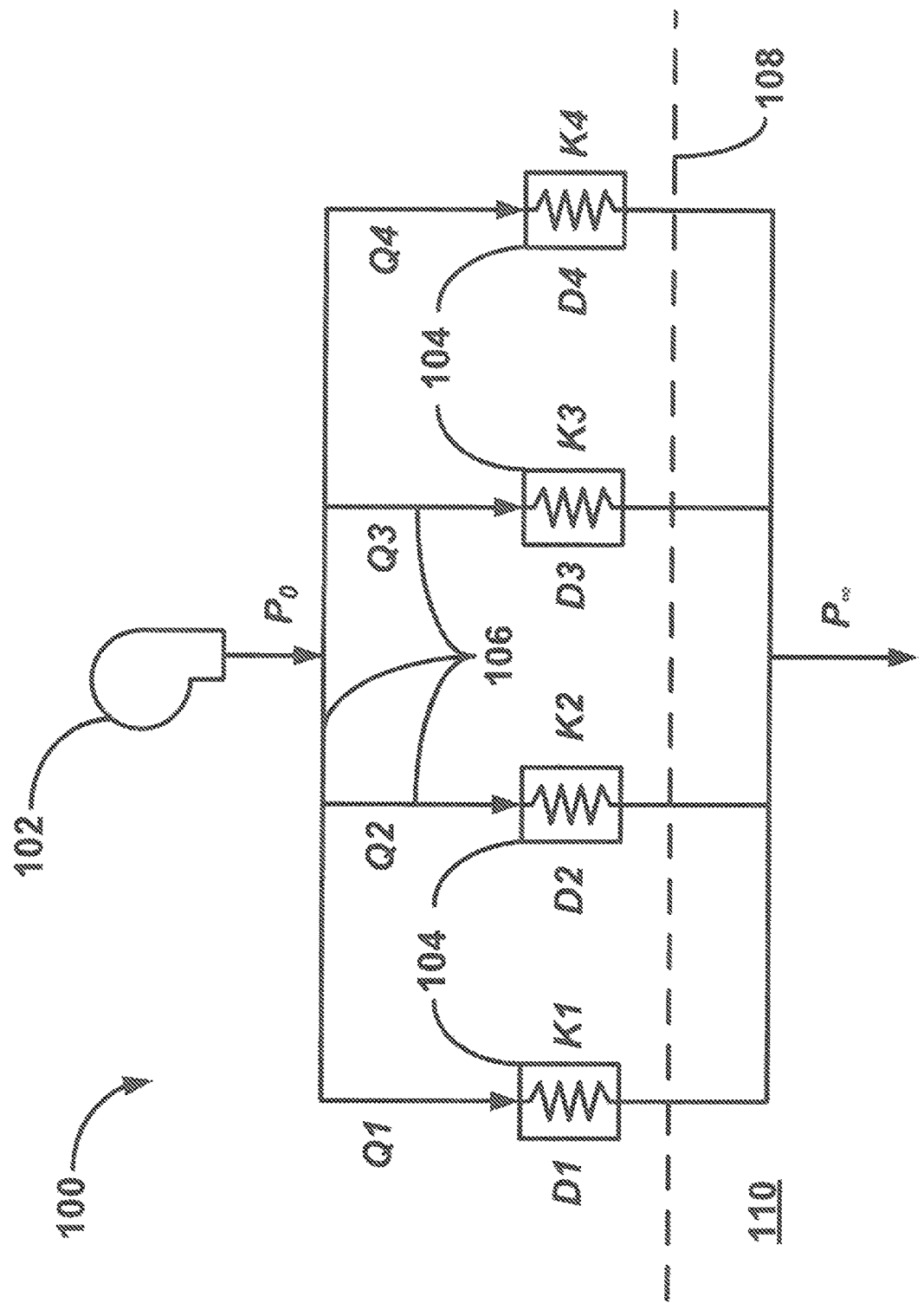
FIGS. 7A-7C are schematic diagrams illustrating certain pressure and flow characteristics of an example HVAC system.

For reference in illustrating in greater detail the calculations that the air flow measurement system 10 performs in implementing the predictive balancing method, FIG. 7A illustrates a schematic diagram representative of a simple branch of an HVAC system 100 in which fan 102 supplies conditioned air to four terminals 104, identified as D1-D4, via ductwork 106. The dashed line 108 in FIG. 7A represents the ceiling that helps define the space 110 into which the condition air is discharged from the terminals 104. The methods described herein are valid regardless of the number of branches and/or terminals in the HVAC system. In FIG. 7A, Q1-Q4 represent the flow through their respective terminals D1-D4. $P_0$ represents the static pressure of the air discharged from the fan 102 and $P_\infty$ represents the pressure in the space 110 (e.g., room), into which air is discharged from terminals 104.

To understand the principles under which the predictive balancing method of the invention operates, it is worthwhile to understand the derivation and development of the equations implemented by the method. In these equations, the k-factor represents the entire load of the flow path to a single terminal 104 of the HVAC system 100. The initial k-factor, $k_i$, for each of terminals D1-D4 is calculated:

$$k_1 = \frac{\sqrt{\Delta P}}{Q_1}, k_2 = \frac{\sqrt{\Delta P}}{Q_2}, k_3 = \frac{\sqrt{\Delta P}}{Q_3}, k_4 = \frac{\sqrt{\Delta P}}{Q_4}$$

where $\Delta P$ is the pressure drop between the static pressure at the fan ($P_0$) and the room ($P_\infty$). Final k-factors, that is, k-factors after the adjustment is made to the terminal, are calculated as:

$$k_{f_i} = \frac{\sqrt{\Delta P_f}}{Q_{f_i}} = \frac{Q_{f_{key}} \sqrt{\Delta P}}{Q_{key} Q_{f_i}},$$

where i represents the terminal number and the key defines the terminal where the damper will remain open. Therefore, in the example four diffuser HVAC system, $$k_{2f} = \frac{Q_{f_1} \sqrt{\Delta P}}{Q_1 Q_{f_2}}, k_{3f} = \frac{Q_{f_1} \sqrt{\Delta P}}{Q_1 Q_{f_3}}, k_{4f} = \frac{Q_{f_1} \sqrt{\Delta P}}{Q_1 Q_{f_4}},$$

where final pressure drop $\Delta P_f$ follows the relation:

$$\frac{\sqrt{\Delta P_f}}{Q_{f_{key}}} = \frac{\sqrt{\Delta P}}{Q_{key}}$$

Figure 7B:
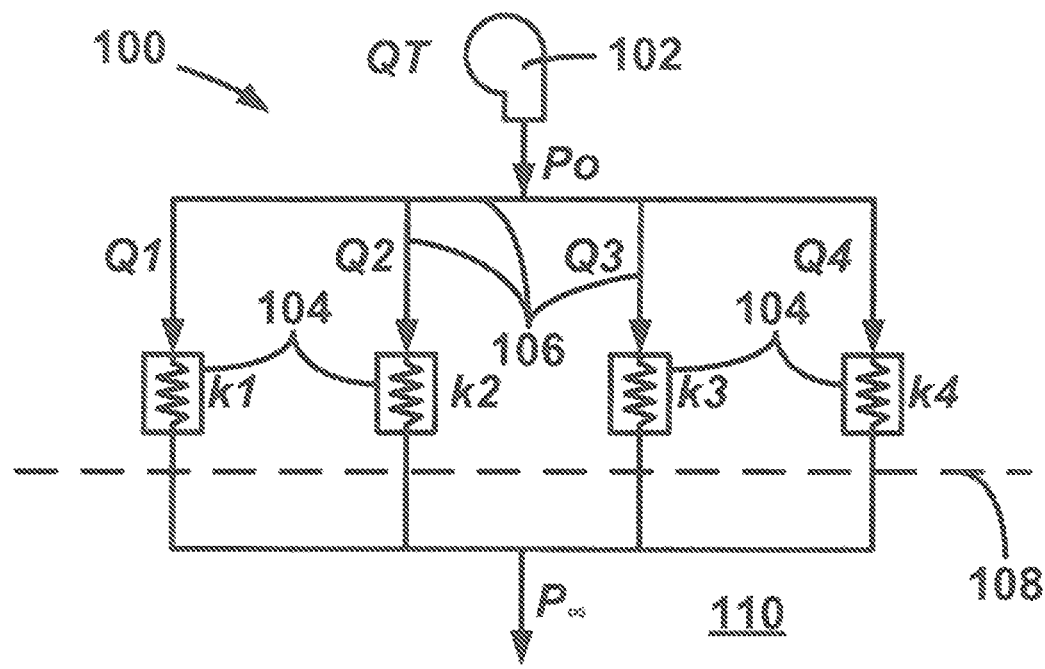
Figure 7C:
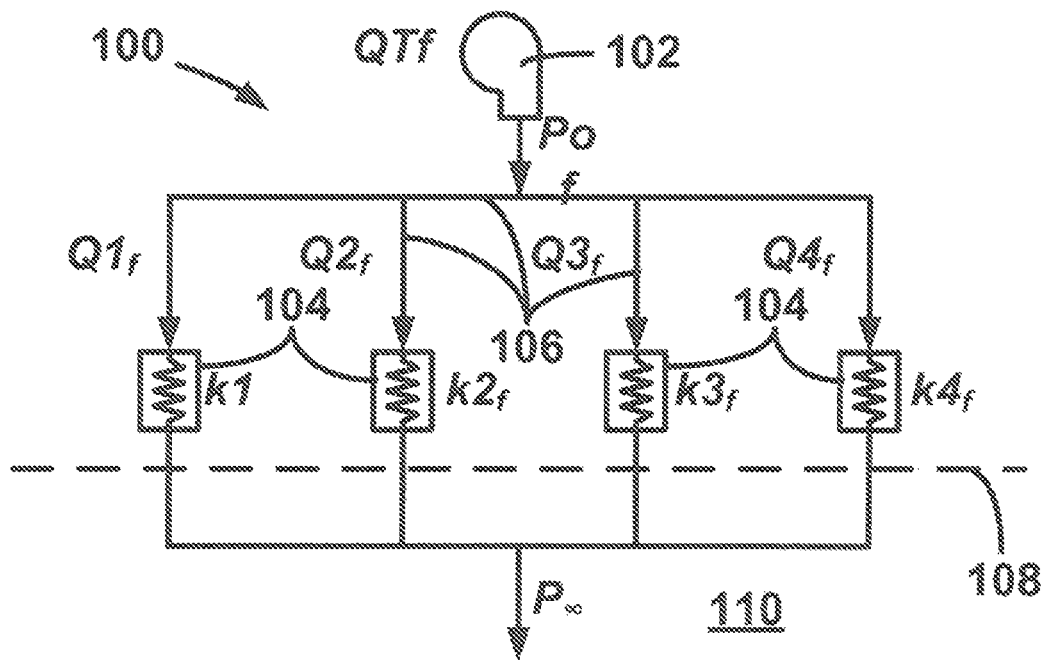

Referring to FIG. 7A, using the pneumatic analogy to electrical circuits, the terminals 104 can be considered resistors to flow and are thus illustrated with the electrical symbol for resistors. The "resistance" of the terminals 104 thus varies with factors, such as the diffuser configuration (see FIGS. 6A-6J) and the position of the dampers associated with the terminals. Considering the HVAC system 100 in this manner, FIGS. 7B and 7C illustrate the flows $Q_i$ and k-factors $k_i$ for the system at the initial stage of balancing (FIG. 7B) and at the final stage of balancing (FIG. 7C). Referring to these figures, it should be noted that 1) the pressure drop changes as each damper is adjusted/closed during the balancing process, and 2) that the k-factor for the key terminal, $k_1$ in this example, does not change because its damper is not adjusted, but instead is left full open.

Those skilled in the art will appreciate that electrical and fluid circuits are analogous systems. Voltage drops across resistors in a parallel electric circuit can be calculated as:

$$R_2 I_2 = \frac{I_1 + I_3 + I_4}{\frac{1}{R_1} + \frac{1}{R_3} + \frac{1}{R_4}}$$

Applying the electrical current/fluid flow analogy:

$$\sqrt{\Delta P} = \sqrt{P_o - P_\infty} = Q_{2s} k_{f2} = \frac{Q_{f1} + Q_3 + Q_4}{\frac{1}{k_{f1}} + \frac{1}{k_3} + \frac{1}{k_4}}$$

$$Q_{2s} k_{f2} = (Q_{f1} + Q_3 + Q_4) \left[ \frac{1}{k_{f1}} + \frac{1}{k_3} + \frac{1}{k_4} \right]^{-1}$$

Since $Q_T = Q_1 + Q_2 + Q_3 + Q_4$, then $$Q_{2s} k_{f2} = (Q_T - Q_{2s}) \left[ \frac{1}{k_{f1}} + \frac{1}{k_3} + \frac{1}{k_4} \right]^{-1} \quad \text{(Eq. 1)}$$

$$Q_{2s} = \frac{Q_T}{1 + \left[ k_{f2} \left( \frac{1}{k_{f1}} + \frac{1}{k_3} + \frac{1}{k_4} \right) \right]}$$

$$Q_{2s} = \frac{Q_T}{1 + \left[ \frac{Q_{f1} \sqrt{\Delta P}}{Q_1 Q_{f2}} \left( \frac{1}{\frac{\sqrt{\Delta P}}{Q_1}} + \frac{1}{\frac{\sqrt{\Delta P}}{Q_3}} + \frac{1}{\frac{\sqrt{\Delta P}}{Q_4}} \right) \right]}$$

$$Q_{2s} = \frac{Q_T}{1 + \left[ \frac{Q_{f1} \sqrt{\Delta P}}{Q_1 Q_{f2}} \left( \frac{Q_1}{\sqrt{\Delta P}} + \frac{Q_3}{\sqrt{\Delta P}} + \frac{Q_4}{\sqrt{\Delta P}} \right) \right]}$$

$$Q_{2s} = \frac{Q_T}{1 + \left[\frac{Q_{f1}\sqrt{\Delta P}}{Q_1 Q_{f2}} \cdot \frac{1}{\sqrt{\Delta P}}(Q_1 + Q_3 + Q_4)\right]} \quad \text{(Eq. 2)}$$

$$Q_2 = \frac{Q_T}{1 + \left[\frac{Q_{f1}}{Q_1 Q_{f2}} \cdot (Q_1 + Q_3 + Q_4)\right]}$$

where setpoint values are indicated with a subscript "s" and final values are indicated with a subscript "f."

The equations set forth above are illustrative of the calculations that can be performed to determine flows for terminal D2 in the four terminal system of FIGS. 7A-7C. It should be appreciated, however, that these equations can be modified and/or rearranged to determine flows for any of the terminals in the illustrated example HVAC system 100 and for terminals in any HVAC system regardless of how many terminals that are included in that system. Generalizing Equations 1 and 2 for systems to solve for $Q_i$ in an HVAC system having N number of terminals:

$$Q_{is} = \frac{Q_T}{1 + \left[k_{if}\left(\frac{1}{k_1} + \frac{1}{k_2} + \frac{1}{k_3} + \ldots \frac{1}{k_{i-1}} + \frac{1}{k_{i+1}} \ldots + \frac{1}{k_N}\right)\right]} \quad \text{(Eq. 3)}$$

$$Q_{is} = \frac{Q_T}{1 + \left[\frac{Q_{f1}}{Q_1 Q_{fi}} \cdot (Q_1 + Q_2 + Q_3 + \ldots Q_{i-1} + Q_{i+1} + \ldots + Q_N)\right]} \quad \text{(Eq. 4)}$$

Those skilled in the art will appreciate that all of the equations disclosed herein with respect to the example four diffuser system can be similarly generalized in accordance with the above. It should be noted that Equations 1 and 4 depend only on flow rates, as pressure is canceled out.

The equations set forth above are implemented by the predictive balancing method of the invention performed by the air flow measurement system 10 to calculate flows and flow set points as the k-factors change as a result of adjusting the dampers at each terminal. Generalizing Equation 3 to solve for the set point $Q_{is}$ and $Q_{Ns}$ for any terminal under adjustment $2 \leq i \leq N-1$ in an HVAC system having N number of terminals, Equation 3 is modified as:

$$Q_{s_i} = \frac{Q_T}{1 + \left(k_{f_i} \cdot \left[\left(\sum_{a=1}^{i-1}\frac{1}{k_{f_a}}\right) + \left(\sum_{b=i+1}^{N}\frac{1}{k_b}\right)\right]\right)} \quad \text{(Eq. 5)}$$

and $$Q_{s_N} = \frac{Q_T}{1 + \left(k_{f_N} \cdot \left[\sum_{c=1}^{N-1}\frac{1}{k_{f_c}}\right]\right)} \quad \text{(Eq. 6)}$$

where $Q_T$ represents total system flow, $k_b$ represent the initial k-factors for terminals $i+1 \leq b \leq N$. $k_{f_a}$, $k_{f_c}$ and $k_{f_i}$ represent the final k-factors for terminals $1 \leq a \leq i-1$, $1 \leq c \leq N-1$, and i, respectively.

Equations 5 and 6 can be converted such that all the k constants are in terms of flow (Q) only:

$$Q_{s_i} = \frac{Q_T}{1 + \left(\frac{Q_{f1}}{Q_1 Q_{f_i}} \cdot \left[\left(\sum_{a=1}^{i-1}\frac{Q_1 Q_{f_a}}{Q_{f1}}\right) + \left(\sum_{b=i+1}^{N} Q_b\right)\right]\right)} \quad \text{(Eq. 7)}$$

and $$Q_{s_N} = \frac{Q_T}{1 + \left(\frac{Q_{f1}}{Q_1 Q_{f_i}} \cdot \left[\sum_{c=1}^{N-1}\frac{Q_1 Q_{f_c}}{Q_{f1}}\right]\right)} \quad \text{(Eq. 8)}$$

where $Q_T$ represents total system flow, $Q_b$ and $Q_1$ represent the initial flows for terminals $i+1 \leq b \leq N$, and 1, $Q_{f_i}$, $Q_{f_a}$, $Q_{f_c}$ and $Q_{f_1}$ represent the target flows for terminal 1, $1 \leq a \leq i-1$, $1 \leq c \leq N-1$, and i, respectively.

Further, the equations to solve for the predicted flows $Q_{P_1}$, $Q_{P_x}$, $Q_{P_z}$ and $Q_{P_N}$ in terminals 1, $2 \leq x \leq i-1$, $i+1 \leq z \leq N-1$ and N as a result of setting terminal i are:

Terminal 1:

$$Q_{P_1} = \frac{Q_T}{1 + \left(k_{f_1} \cdot \left[\left(\sum_{d=2}^{i}\frac{1}{k_{f_d}}\right) + \left(\sum_{c=i+1}^{N}\frac{1}{k_c}\right)\right]\right)} \quad \text{(Eq. 9)}$$

Terminal x, where $2 \leq x \leq i-1$:

$$Q_{P_x} = \frac{Q_T}{1 + \left(k_{f_x} \cdot \left[\left(\sum_{e=1}^{i-2}\frac{1}{k_{f_e}}\right) + \frac{1}{k_{f_i}} + \left(\sum_{c=i+1}^{N}\frac{1}{k_c}\right)\right]\right)} \quad \text{(Eq. 10)}$$

Terminal z, where $i+1 \leq z \leq N-1$:

$$Q_{P_z} = \frac{Q_T}{1 + \left(k_z \cdot \left[\left(\sum_{v=1}^{i}\frac{1}{k_{f_v}}\right) + \left(\sum_{w=i+2}^{N}\frac{1}{k_w}\right)\right]\right)} \quad \text{(Eq. 11)}$$

Terminal N:

$$Q_{P_N} = \frac{Q_T}{1 + \left(k_N \cdot \left[\left(\sum_{v=1}^{i}\frac{1}{k_{f_v}}\right) + \left(\sum_{z=i+1}^{N-1}\frac{1}{k_z}\right)\right]\right)} \quad \text{(Eq. 12)}$$

where $Q_T$ represents total system flow and $k_c$, $k_z$, $k_w$, $k_N$ and $k_z$ represent the initial k-factors for terminals $i+1 \leq c \leq N$, $i+1 \leq z \leq N-1$, $i+2 \leq z \leq N$, N, and $i+1 \leq z \leq N-1$. Additionally, $k_{f_1}$, $k_{f_x}$, $k_{f_d}$, $k_{f_i}$, $k_{f_v}$ and $k_{f_e}$ represent the final k-factor for terminal 1, $2 \leq x \leq i-1$, $2 \leq d \leq i$, i, $1 \leq v \leq i$, and $1 \leq e \leq i-2$, respectively.

Equation 9, 10, 11 and 12 can be converted such that all the k constants are in terms of flow (Q) only. $Q_{P_1}$, $Q_{P_x}$, $Q_{P_z}$ and $Q_{P_N}$ in terminals 1, $2 \leq x \leq i-1$, $i+1 \leq z \leq N-1$ and N as a result of setting terminal i are:

Terminal 1:

$$Q_{P_1} = \frac{Q_T}{1 + \left(\frac{1}{Q_1} \cdot \left[\left(\sum_{d=2}^{i} \frac{Q_1 Q_{f_d}}{Q_{f_1}}\right) + \left(\sum_{c=i+1}^{N} Q_c\right)\right]\right)} \quad \text{(Eq. 13)}$$

Terminal x, where $2 \leq x \leq i-1$:

$$Q_{P_x} = \frac{Q_T}{1 + \left(\frac{Q_{f_1}}{Q_1 Q_{f_x}} \cdot \left[\left(\sum_{e=1}^{i-2} \frac{Q_1 Q_{f_e}}{Q_{f_1}}\right) + \frac{Q_1 Q_i}{Q_{f_1}} + \left(\sum_{c=i+1}^{N} Q_c\right)\right]\right)} \quad \text{(Eq. 14)}$$

Terminal z, where $i+1 \leq z \leq N-1$:

$$Q_{P_z} = \frac{Q_T}{1 + \left(\frac{1}{Q_z} \cdot \left[\left(\sum_{v=1}^{i} \frac{Q_1 Q_{f_v}}{Q_{f_1}}\right) + \left(\sum_{w=i+2}^{N} Q_w\right)\right]\right)} \quad \text{(Eq. 15)}$$

Terminal N:

$$Q_{P_N} = \frac{Q_T}{1 + \left(\frac{1}{Q_N} \cdot \left[\left(\sum_{v=1}^{i} \frac{Q_1 Q_{f_v}}{Q_{f_1}}\right) + \left(\sum_{z=i+1}^{N-1} Q_z\right)\right]\right)} \quad \text{(Eq. 16)}$$

where $Q_T$ represents total system flow and $Q_c$, $Q_w$, $Q_N$ and $Q_z$ represent the initial flows for terminals $i+1 \leq c \leq N$, $i+2 \leq w \leq N$, N, and $i+1 \leq z \leq N-1$. Additionally, $Q_{f_1}$, $Q_{f_x}$, $Q_{f_d}$, $Q_{f_i}$, $Q_{f_v}$ and $Q_{f_e}$ represent the target flows for terminal 1, $2 \leq x \leq i-1$, $2 \leq d \leq i$, $1 \leq v \leq i$, and $1 \leq e \leq i-2$, respectively.

Predictive Balancing Processes

Viewing the above equations, it will be appreciated that for each equation that utilizes k-factors to determine flow (Eq. 1, 3, 5, 6, 9, 10, 11 and 12), there is a corresponding equation (Eq. 2, 4, 7, 8, 13, 14, 15 and 16) that uses measured flows to perform the same calculation. Therefore, according to the invention, the equations set forth above can be used to determine flow set points for the terminals of an HVAC system given only target flow rates and measured flow rates for each diffuser. Implementing equations 2, 4, 7, 8, 13, 14, 15 and 16 in the predictive balancing process implemented with the air flow measurement system 10 allows for calculating flow set points for each terminal.

Those skilled in the art will appreciate that each adjustment made to a diffuser affects the flows for all other diffusers in the system. To obtain the most precise balancing of the HVAC system would therefore require taking into account the k-factor impact produced by each terminal adjustment on every subsequent terminal adjustment. The predictive balancing process implemented with the air flow measurement system 10 can compensate for these impacts, as discussed below. To do so, however, requires additional time and effort on the part of the HVAC technician performing the balancing operation.

The precision with which an HVAC is balanced can depend on a variety of factors. In some scenarios, rough balancing to within ±5 to ±10% of design flow, for example, may be acceptable where precise comfort level control is not necessary. In other scenarios, the particulars features of the HVAC system being balanced may render unnecessary compensating for the k-factor impacts caused by terminal adjustments. This may be the case where, for example, in HVAC systems where the blower and/or ductwork are oversized, so the terminal adjustments do not substantially affect the load on the system.

In view of this, according to the invention, the predictive balancing process implemented by the air flow measurement system 10 can include multiple processes or modes with varying degrees of precision in terms of the degree to which the process accounts for the k-factor impacts caused by terminal adjustments. In the example embodiment illustrated herein, the predictive balancing process can include three such processes or modes: an ideal balancing mode, an express balancing mode, and a precision balancing mode.

Figure 8A:
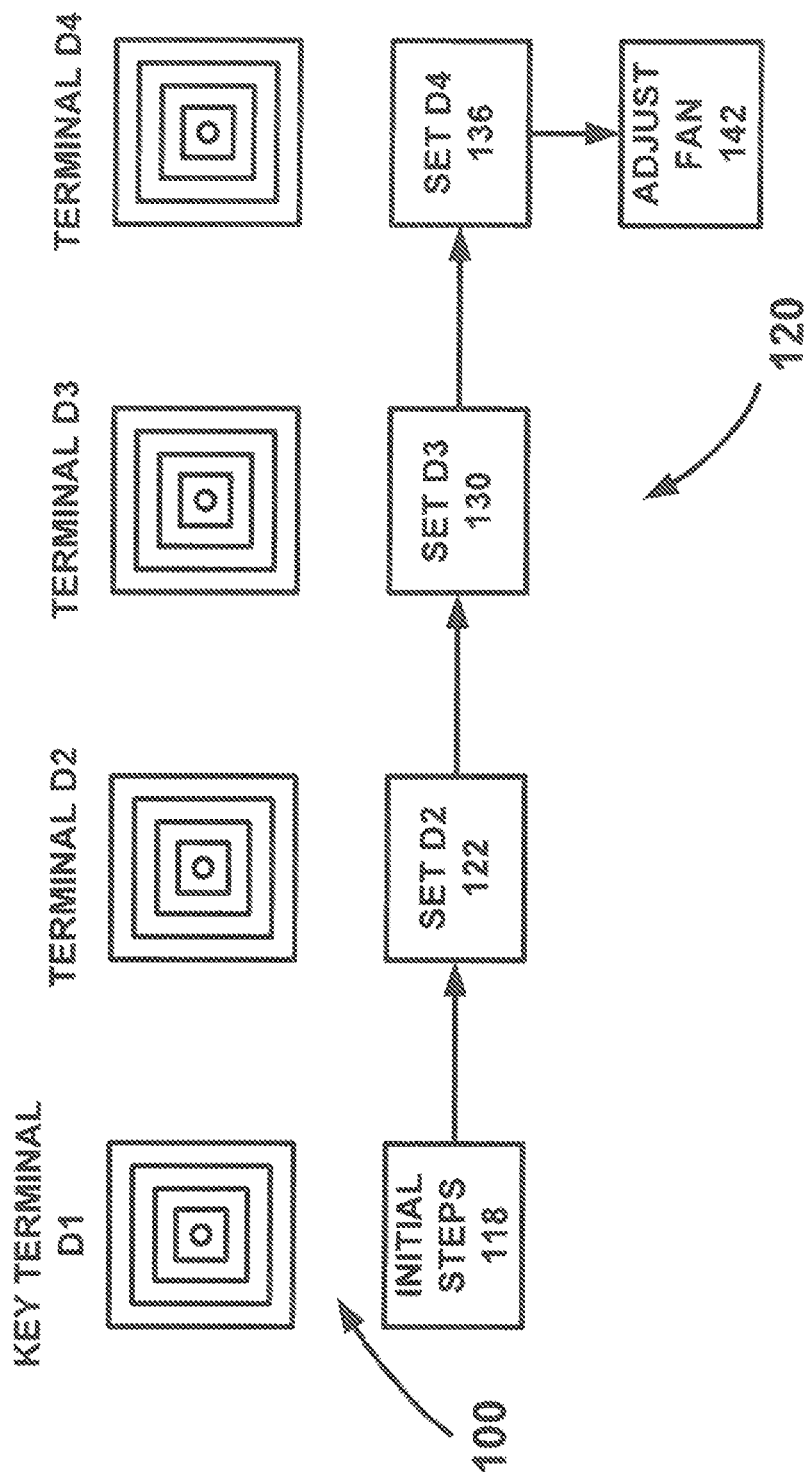
FIGS. 8A-8C are schematic diagrams illustrating processes for balancing the example HVAC system.
Figure 8B:
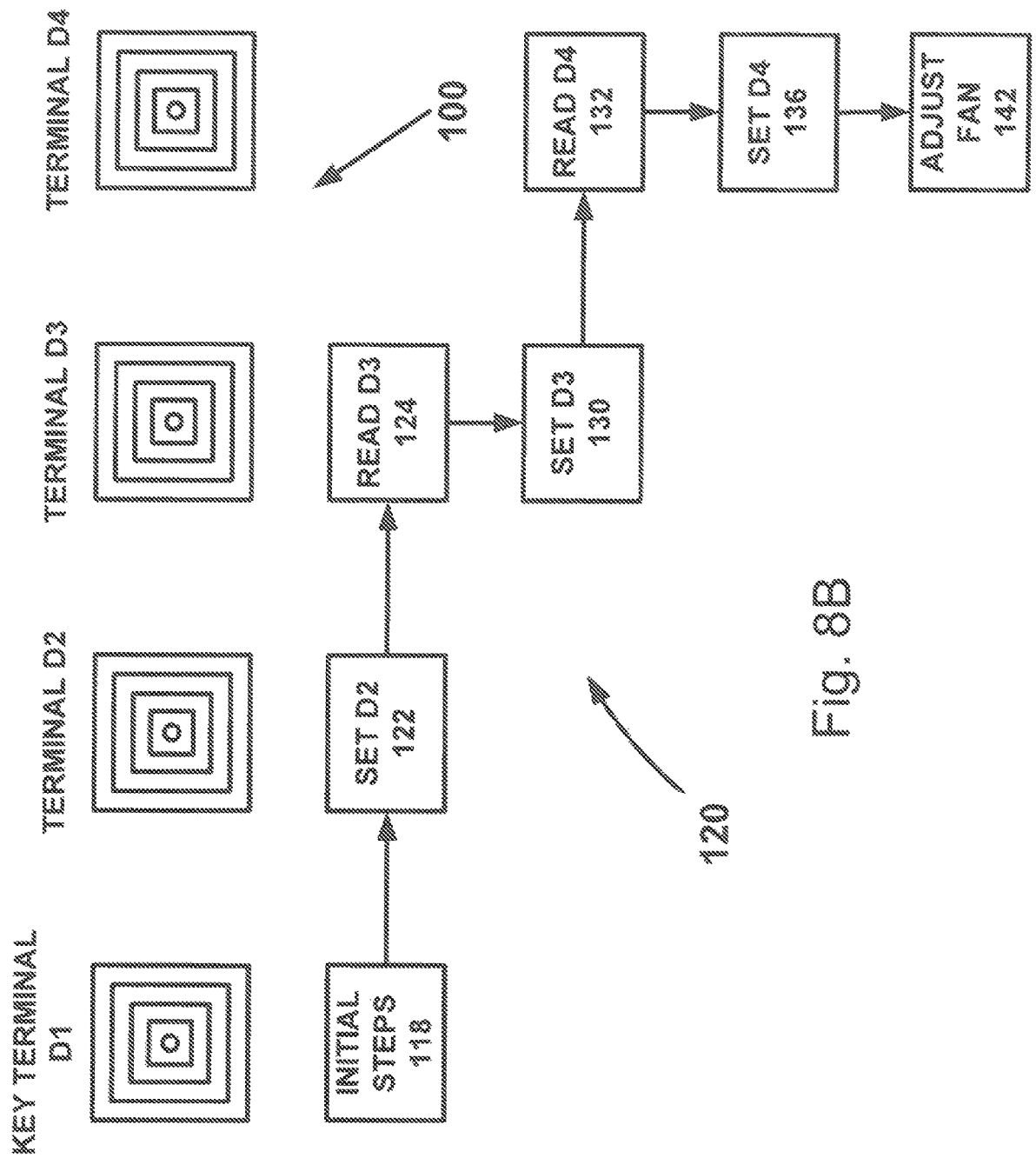
Figure 8C:
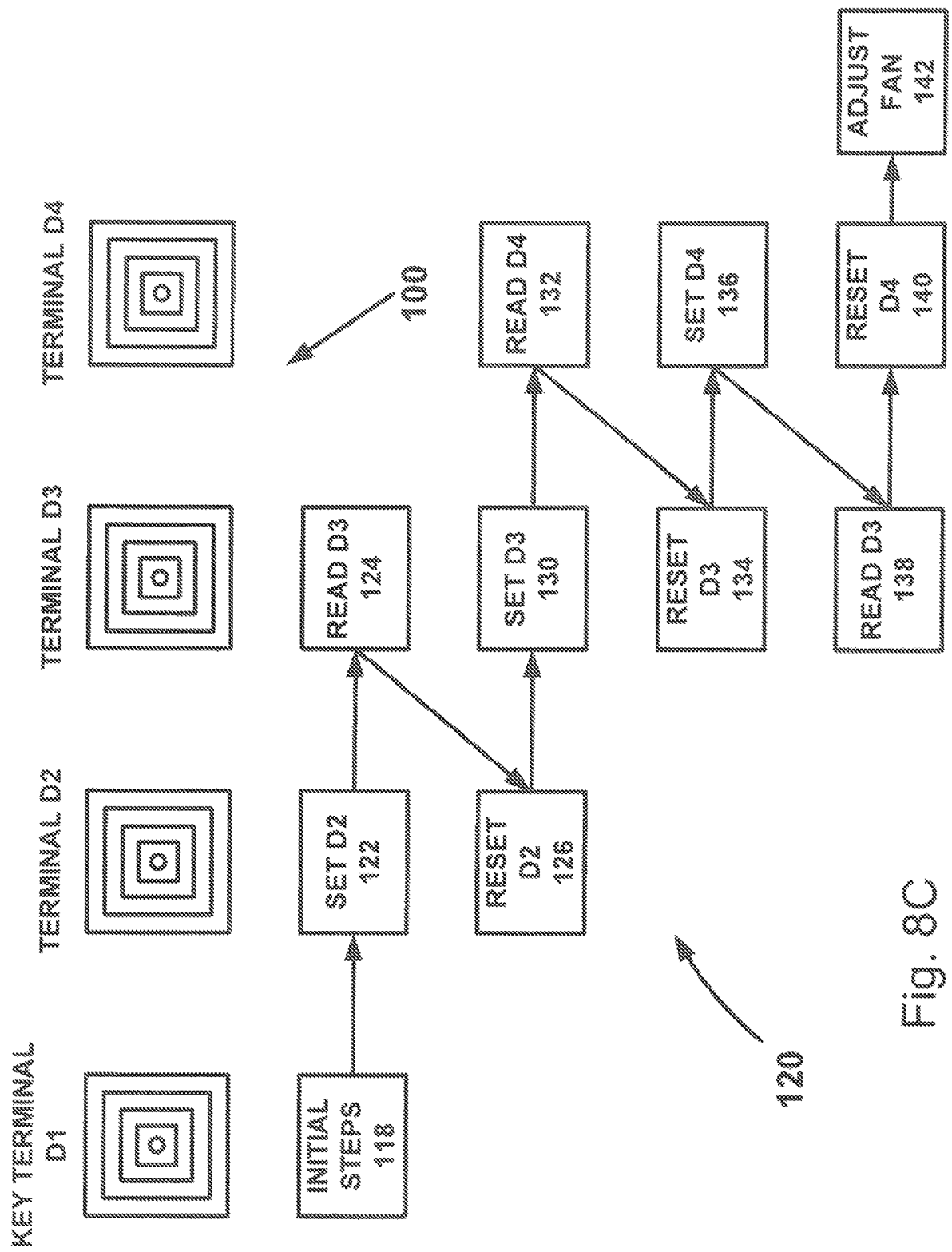

FIGS. 8A-8C are high-level flow diagrams that illustrate the process 120 implemented in these different modes. The ideal balancing mode of the predictive balancing process 120 is illustrated in FIG. 8A. The express balancing mode of the predictive balancing process 120 is illustrated in FIG. 8B. The precision balancing mode of the predictive balancing process 120 is illustrated in FIG. 8C. Regardless of in which mode the process 120 operates, the process includes initial steps that are necessary for the process to function. These initial steps, indicated at 118 in FIGS. 8A-8C, can include:

Entering specification data for the HVAC system 100 (e.g., number of terminals, types of terminals, target flow rates for each terminal) into the air flow measurement system 10;

Placing all terminals of the HVAC system 100 in the fully opened condition; and Taking initial air flow measurements for each terminals in the HVAC system 100 using the air flow measurement system 10.

Identifying the key terminal for the HVAC system 100. The process 120 determines the key terminal based on the initial air flow measurements obtained during the initial steps 118. The "key" terminal is, by definition, the terminal whose initial-to-target flow ratio is the lowest. Throughout the balancing process, the key terminal D1 is left full open, including when the process is complete and the HVAC system 100 is balanced. This ensures that the balanced system 100 will run at optimum efficiency. Terminals D2-D4 are set systematically and sequentially in a manner that is determined by which balancing mode (ideal, express, or precision) is selected by the HVAC technician. By "sequentially," it is meant that the terminals are stepped through and adjusted in a one-by-one manner in an order determined by the process 120. The first terminal in the sequence is adjusted, the next is adjusted, and so on, until all of the terminals in the HVAC system are set, and the system is balanced. Accordingly, all of the balancing modes include setting or "SET" steps in which the terminal is adjusted or "set." Depending on the selected balancing mode, the steps involved can also include reading or "READ" steps, and resetting or "RESET" steps, which are described in detail below.

SET steps involve setting the terminal under adjustment to the flow set point that is calculated by the system 10. To set the terminal, the air flow hood 20, 60 is positioned on the terminal and the damper associated with the terminal is adjusted until the flow measured by the hood is equal to the set point. READ steps involve reading, via the air flow hood 20, 60, the flow through another terminal in the system after the adjustment is made at the SET step. The purpose of the READ step is to measure a flow resulting from the previous SET step and compare that measured flow to a previously recorded or calculated flow for that terminal in order to determine the impact that setting the terminal under adjustment had on the load of the HVAC system 100, i.e., the k-factors for the terminals. At the RESET step, the terminal under adjustment is reset, i.e., re-adjusted, to a re-calculated flow set point. This recalculated set point can be based on the system impact measured via the READ step or estimated via calculation.

Predictive Balancing Process—Ideal Mode

The ideal balancing mode of the predictive balancing process 120 for balancing the HVAC system 100 (see FIGS. 7A-7C) is illustrated in FIG. 8A. In the ideal balancing mode, the flow set points for each terminal are determined based on the equations set forth above. The ideal mode is meant for situations where circumstances dictate or allow for balancing the terminals quickly with some room for potential losses in precision. The ideal mode is intended for HVAC systems where the k-factors of the branches remain relatively constant as terminals are adjusted due low flow complexity features, such as minimal abrupt bends/transitions in the ductwork, and over-sized fans or blowers that easily overcome any backpressure build-up. In the ideal mode, the set point for each terminal is determined based only on the initially measured flows and any flows that are set prior to the terminal under adjustment.

Initial Steps

Implementing the ideal balancing mode of the predictive balancing process 120, the system 10 instructs the user to perform tasks through the user interface 40 or smart device 74 of the air flow hood 20, 60. In the ideal balancing mode, the predictive balancing process 120 begins with the initial steps 118. During the initial steps 118, the system 10 instructs the user to enter system information, such as the number of terminals in the HVAC system 100 and the target flow rates for each terminal. During the initial steps 118, the system 10 can also prompt the user to enter additional information, such as the type or configuration for each terminal shown in FIG. 6A-6J. To ensure that the HVAC system 100 is balanced as efficiently as possible, the system 10 also instructs the user to ensure that all of the terminals D1-D4 are adjusted to full open. The system 10 further instructs the user to use the air flow hood 20, 60 to obtain initial flow readings from each of terminals D1-D4. For purposes of illustration in this example, these initial flow readings can be:

$$Q_1 = 311 \text{ cfm}, Q_2 = 691 \text{ cfm}, Q_3 = 630 \text{ cfm}, Q_4 = 626 \text{ cfm}$$

The total air flow discharged into the space 110 by the HVAC system 100 can be quantified as follows:

$$Q_T = \sum_{i=1}^{N=4} Q_i = 2258 \text{ cfm}$$

where i represents the number for each terminal and N is the total number of terminals (in this case, four). Total flow $Q_T$ can be used to determine flow ratios:

$$r_1 = \frac{Q_1}{Q_T}, \quad r_2 = \frac{Q_2}{Q_T}, \quad r_3 = \frac{Q_3}{Q_T}, \quad r_4 = \frac{Q_4}{Q_T}$$

To balance the HVAC system 100, target flow rates, $Q_{f_i}$, are required for each terminal. For the HVAC system 100, the target flows are specified by the HVAC architect/engineer that designed the system. For example, target flows for the system illustrated in FIGS. 7A-7C, as entered by the user at initial steps 118, can be 450 cfm for each diffuser 104, that is:

$$Q_{f_1} = 450 \text{ cfm}, Q_{f_2} = 450 \text{ cfm}, Q_{f_3} = 450 \text{ cfm}, Q_{f_4} = 450 \text{ cfm}$$

Total target flow is thus:

$$Q_{f_T} = \sum_{i=1}^{N=4} Q_{f_i} = 1800 \text{ cfm}$$

Initially measured flow to target flow ratios can be determined:

$$\frac{Q_1}{Q_{f_1}} = \frac{311}{450} = 0.61, \quad \frac{Q_2}{Q_{f_2}} = \frac{691}{450} = 1.53$$

$$\frac{Q_3}{Q_{f_3}} = \frac{630}{450} = 1.39, \quad \frac{Q_4}{Q_{f_4}} = \frac{626}{450} = 1.40$$

Based on the information obtained during the initial steps 118 of the process 120, the system 10 identifies the key terminal as the terminal whose initially measured flow is closest to target flow, i.e., the terminal with the lowest flow to target flow ratio. In the present example, terminal D1 has the lowest flow to target ratio at 0.61. Once the key terminal is identified, the system 10 orders the remaining terminals based on their initially measured flow to target flow ratios from high to low. This is not critical, but it does help to maximize the resolution of damper adjustments throughout the balancing process, so it can be considered somewhat important. Highest ratio terminals will require the largest damper adjustments, so it is best, but not essential, to balance those terminals first, so that the potential for impacting other dampers and introducing errors is lessened with each subsequent balancing step.

Terminals D2, D3, and D4 have initial-to-target flow ratios of 1.53, 1.40, and 1.39, respectively. Therefore, terminal D2 is the first terminal that will be adjusted. The ratios for terminals D3 and D4 are essentially the same, so adjusting them in order, i.e., D3 then D4, instead of strictly in order of their ratios can be acceptable. Although the system 10 will instruct the user to adjust D4 then D3, the system can be configured so that the user can override the predetermined order and adjust in the order he/she desires.

According to the predictive balancing method, each terminal is adjusted to achieve a flow at that terminal for the current state of the system 100 that corresponds to system balance once all other terminals are adjusted. The flow to which each terminal is adjusted is therefore a flow that the system 10, implementing the predictive balancing method 120, predicts will result in that terminal achieving its target flow, $Q_{f_i}$, when all other terminals are adjusted. According to this method, balancing the final terminal (D4 in the present example) will bring the entire HVAC system 100 into balance.

FIG. 8A illustrates a SET pattern that is characteristic of the ideal mode of the predictive balancing process 120. According to the express mode of the process 120, terminal D2 is adjusted at SET step 122 to a set point calculated according to the equations disclosed herein and based on the initially measured flow rates and target flow rates. A flow through terminal D3 resulting from terminal D2 adjustment at the SET step 122 is then estimated/calculated and used to calculate a set point for terminal D3. Terminal D3 is adjusted to that set point at SET step 130.

This systematic pattern of SET steps in the ideal balancing mode of the process 120 continues in this manner through every terminal in the HVAC system 100, regardless of the size of the system and number of terminals in the system, until the last terminal is encountered. In the illustrated HVAC system 100, terminal D4 is the last terminal to be set. At this point, the system 100 is balanced, and the process can proceed to step 142, where the fan speed is adjusted to bring the balanced flows to target.

SET Terminal 2

Utilizing the equations set forth above in conjunction with the initial readings taken from the fully open terminals 104, and recalling that the key terminal—D1 in this example—is left fully open, the first terminal to set is that terminal with the lowest target ratio. Referring back to FIG. 8A, the air flow through terminal D2 is set at SET step 122. The system 10 calculates the flow set point $Q_{s_2}$ for terminal D2 using Equation 5 (or Equation 7), and the resulting predicted flows $Q_{P_{i=1,3,4}}$ using Equations 13, 14, 15 and 16 (or Equations 9, 10, 11 and 12), as follows:

$$Q_{s_2} = \frac{Q_T}{1 + \left[\frac{Q_{f_1}}{Q_1 Q_{f_2}} \cdot (Q_1 + Q_3 + Q_4)\right]} = 374.1 \text{ cfm}$$

$$Q_{P_1} = \frac{Q_T}{1 + \left[\frac{1}{Q_1}\left(\frac{Q_1 Q_{f_2}}{Q_{f_1}} + Q_3 + Q_4\right)\right]} = 374.1 \text{ cfm}$$

$$Q_{P_3} = \frac{Q_T}{1 + \left[\frac{1}{Q_3}\left(\frac{Q_1 Q_{f_2}}{Q_{f_1}} + Q_1 + Q_4\right)\right]} = 753.1 \text{ cfm}$$

$$Q_{P_4} = \frac{Q_T}{1 + \left[\frac{1}{Q_4}\left(\frac{Q_1 Q_{f_2}}{Q_{f_1}} + Q_3 + Q_1\right)\right]} = 757.9 \text{ cfm}$$

Through the user interface of the air flow hood 20, 60, the system 10 instructs the user to adjust terminal D2 until the flow measured through the hood equals the flow set point $Q_{s_2}$. Terminal D2 is thus set (SET step 122 complete). As a result of setting terminal D2, the flow rates through the other terminals D1, D3, and D4 should adjust to the predicted flows $Q_{P_1}$, $Q_{P_3}$, and $Q_{P_4}$, respectively. According to the predictive balancing process 120, the system calculates a new predicted total flow $Q_{P_T}$ resulting from setting terminal D2:

$$Q_{P_T} = Q_{s_2} + \sum_{j=1}^{b=3} Q_{P_j} = 2259.2 \text{ cfm}$$

where $Q_{P_j}$ are the predicted flows for the other terminals and b is the total number of other terminals.

SET Terminal 3

Having set terminal D2, terminal D3 can be adjusted next, and the process 120 proceeds to SET step 130. Using Equation 7 (or 5), terminal D3 is set to $Q_{s_{33}}$ (the "33" indicating the second time that flow through terminal D3 is calculated) at SET step 130, as shown in FIG. 8A:

$$Q_{s_{33}} \cong \frac{Q_T}{1 + \left[\frac{Q_{f_1}}{Q_1 Q_{f_3}} \cdot \left(Q_1 + \frac{Q_1 Q_{f_2}}{Q_{f_1}} + Q_4\right)\right]} = 450.44 \text{ cfm}$$

Air flow at the other terminals is predicted based on the effect of closing terminal D3, using Equations 13, 14 and 16 (or 9, 11 and 13):

$$Q_{P_{11}} \cong \frac{Q_T}{1 + \left[\frac{1}{Q_1} \cdot \left(\frac{Q_1 Q_{f_3}}{Q_{f_1}} + \frac{Q_1 Q_{f_2}}{Q_{f_1}} + Q_4\right)\right]} = 450.44 \text{ cfm}$$

$$Q_{P_{22}} \cong \frac{Q_T}{1 + \left[\frac{Q_{f_1}}{Q_1 Q_{f_2}} \cdot \left(Q_1 + \frac{Q_1 Q_{f_3}}{Q_{f_1}} + Q_4\right)\right]} = 450.44 \text{ cfm}$$

$$Q_{P_{44}} \cong \frac{Q_T}{1 + \left[\frac{1}{Q_4} \cdot \left(\frac{Q_1 Q_{f_3}}{Q_{f_1}} + \frac{Q_1 Q_{f_2}}{Q_{f_1}} + Q_1\right)\right]} = 906.67 \text{ cfm}$$

Total flow is predicted based on these newly calculated flows:

$$Q_{P_T} \cong Q_{s_{33}} + (Q_{P_{11}} + Q_{P_{22}} + Q_{P_{44}}) = 2259.2 \text{ cfm}$$

SET Terminal 4

Having set terminal D2 and D3, terminal D4 can be adjusted next, and the process 120 proceeds to SET step 136. Using Equation 8 (or 6), terminal D4 is set to $Q_{s_{444}}$ (the "444" indicating the third time that flow through terminal D4 is calculated) at SET step 136:

$$Q_{s_{444}} \cong \frac{Q_T}{1 + \left[\frac{Q_{f_1}}{Q_1 Q_{f_4}} \cdot \left(Q_1 + \frac{Q_1 Q_{f_2}}{Q_{f_1}} + \frac{Q_1 Q_{f_3}}{Q_{f_1}}\right)\right]} = 564.50 \text{ cfm}$$

Air flow at the other terminals is predicted based on the effect of closing terminal D4, using Equation 13 and 14 (or 9 and 10):

$$Q_{P_{111}} \cong \frac{Q_T}{1 + \left[\frac{1}{Q_1} \cdot \left(\frac{Q_1 Q_{f_3}}{Q_{f_1}} + \frac{Q_1 Q_{f_2}}{Q_{f_1}} + \frac{Q_1 Q_{f_4}}{Q_{f_1}}\right)\right]} = 564.50 \text{ cfm}$$

$$Q_{P_{222}} \cong \frac{Q_T}{1 + \left[\frac{Q_{f_1}}{Q_1 Q_{f_2}} \cdot \left(Q_1 + \frac{Q_1 Q_{f_4}}{Q_{f_1}} + \frac{Q_1 Q_{f_3}}{Q_{f_1}}\right)\right]} = 564.50 \text{ cfm}$$

$$Q_{P_{333}} \cong \frac{Q_T}{1 + \left[\frac{Q_{f_1}}{Q_1 Q_{f_3}} \cdot \left(Q_1 + \frac{Q_1 Q_{f_2}}{Q_{f_1}} + \frac{Q_1 Q_{f_4}}{Q_{f_1}}\right)\right]} = 564.50 \text{ cfm}$$

Total flow is predicted based on these newly predicted flows:

$$Q_{P_T} \cong Q_{s_{444}} + (Q_{P_{111}} + Q_{P_{222}} + Q_{P_{333}}) = 2259.2 \text{ cfm}$$

At this point, the terminals D1-D4 have been adjusted to proportional balance. In the illustrated example, proportional balance has all of terminals D1-D4 at equal flow. Although the flows through terminals are proportionally balanced, they are higher than the target flow rates of 450 cfm. To correct this, the process 120 proceeds to step 142, where the fan or blower (see FIGS. 7A-7C) of the HVAC system 100 is adjusted while using the air flow hood 20, 60 to monitor air flow through any one of terminals D1-D4. When the monitored terminal reads target flow rate (450 cfm), the other terminals will also discharge air at the target flow rate, and the balancing process 120 is complete.

From the above, it will be appreciated that the system 10 implements the ideal mode of the predictive balancing process 120 via an air flow measuring device 20, 60. To do this, the system 10 instructs the user to perform the requisite tasks (e.g., maneuvering of, or data entry into, the air flow measuring device 20, 60) for balancing the HVAC system 100. In this manner, in the ideal balancing mode, the system 10 prompts the user to perform the initial steps, the requisite number of SET steps (depending on the number of terminals in the system 100), and the final blower adjustment step.

Predictive Balancing Process—Express Mode

The express mode of the predictive balancing process 120 for balancing the HVAC system 100 (see FIGS. 7A-7C) is illustrated in FIG. 8B. In the express mode, the flow set point for each terminal is determined based on the equations set forth above. The express mode is meant for situations where abrupt transitions in the piping system and flow drop in the total system as a result of back-pressure build-up can cause changes in the k-factors of the branches. The express mode can compensate for these sources of error by implementing READ steps in the process, which allow for compensation at subsequent terminals, as described below.

Initial Steps

Implementing the express balancing mode of the predictive balancing process 120, the system 10 instructs the user to perform tasks through the user interface 40 or smart device 74 of the air flow hood 20, 60. In the express mode, the predictive balancing process 120 begins with the initial steps 118, where the system 10 instructs the user to enter system information (number of terminals, target flow rates, terminal types/configurations), ensure that all terminals are full open, and obtain initial flow readings from each terminal.

For the sake of comparing the different modes, in this description, we illustrate the example performance of the express mode of the predictive balancing process on a system that is identical to the system described above with regard to the ideal balancing example. Thus, the example implementation of the express mode assumes the same terminal configuration (D1-D4), the same initial measured flows through the terminals, and the same target flows for the terminals. The initial flow ratios for the terminals are also the same and dictate the same terminal balancing order for the express balancing mode example.

The overall balancing strategy implemented in the express mode is essentially the same as the other modes, i.e., each terminal is adjusted to achieve a flow at that terminal for the current state of the system 100 that corresponds to system balance once all other terminals are adjusted. The flow to which each terminal is adjusted is therefore a flow that the system 10, implementing the express mode of the predictive balancing method 120, predicts will result in that terminal achieving its target flow, $Q_{f_i}$, when all other terminals are adjusted. According to this method, balancing the final terminal (D4 in the present example) will bring the entire HVAC system 100 into balance. The express mode differs from the ideal mode in that it provides, via the READ steps, some compensation for the effects that adjusting the terminal under adjustment has on the k-factors for the remaining terminals and total flow in the system.

FIG. 8B illustrates a SET-READ pattern that is characteristic of the express mode of the predictive balancing process 120. According to the express mode of the process 120, terminal D2 is adjusted at SET step 122 to a set point calculated according to the equations disclosed herein and based on the initially measured flow rates and target flow rates. A measured flow through terminal D3 is then obtained at READ step 124 and used to calculate a set point for terminal D3, taking into account an error ratio relating predicted flow and measured flow at terminal D3. Terminal D3 is adjusted to that set point at SET step 130.

This SET-READ pattern of steps in the express balancing mode of the process 120 continues in this manner through every terminal in the HVAC system 100, regardless of the size of the system and number of terminals in the system, until the last terminal is encountered. In the illustrated HVAC system 100, terminal D4 is the last terminal to be set. At this point, the system 100 is balanced, and the process can proceed to step 142, where the fan speed is adjusted to bring the balanced flows to target.

SET Terminal 2

In fact, adjusting first terminal in the express balancing mode, terminal D2 in this example, is identical to adjusting the first terminal in the ideal balancing mode. Referring to FIG. 8B, terminal D2 is set at SET step 122. The system 10 calculates the flow set point $Q_{s_2}$ for terminal D2 using Equation 7 (or Equation 5), and the resulting predicted flows $Q_{p_j}$ using Equation 13, 14, 15 and 16 (or Equation 9, 10, 11 and 12), as follows:

$$Q_{s_2} = \frac{Q_T}{1 + \left[\frac{Q_{f_1}}{Q_1 Q_{f_2}} \cdot (Q_1 + Q_3 + Q_4)\right]} = 374.1 \text{ cfm}$$

$$Q_{P_1} = \frac{Q_T}{1 + \left[\frac{1}{Q_1}\left(\frac{Q_1 Q_{f_2}}{Q_{f_1}} + Q_3 + Q_4\right)\right]} = 374.1 \text{ cfm}$$

$$Q_{P_3} = \frac{Q_T}{1 + \left[\frac{1}{Q_3}\left(\frac{Q_1 Q_{f_2}}{Q_{f_1}} + Q_1 + Q_4\right)\right]} = 753.1 \text{ cfm}$$

$$Q_{P_4} = \frac{Q_T}{1 + \left[\frac{1}{Q_4}\left(\frac{Q_1 Q_{f_2}}{Q_{f_1}} + Q_3 + Q_1\right)\right]} = 757.9 \text{ cfm}$$

Through the user interface of the air flow hood 20, 60, the system 10 instructs the user to adjust terminal D2 until the flow measured through the hood equals the flow set point $Q_{s_2}$. Terminal D2 is thus set (SET step 122 complete). As a result of setting terminal D2, the flow rates through the other terminals D1, D3, and D4 should adjust to the predicted flows $Q_{p_1}$, $Q_{p_3}$, and $Q_{p_4}$, respectively. According to the predictive balancing process 120, the system calculates a new predicted total flow $Q_{P_T}$ resulting from setting terminal D2:

$$Q_{P_T} = Q_{s_2} + \sum_{j=1}^{b=3} Q_{P_j} = 2259.2 \text{ cfm}$$

where $Q_{p_j}$ are the predicted flows for the other terminals and b is the total number of other terminals.

Figure 9:
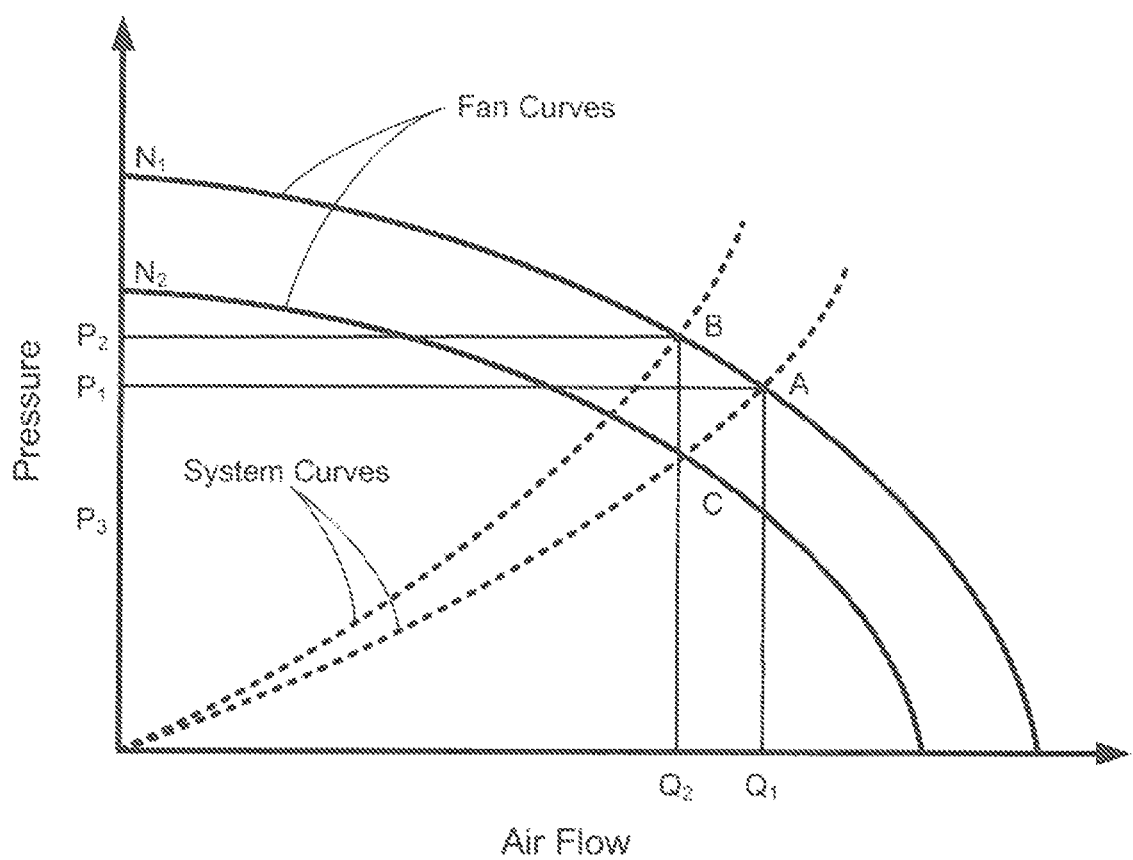
FIG. 9 is a graph illustrating fan curves for the example HVAC system.

However, since the method implemented by the present invention starts with all terminals fully open and adjustments are made by systematically closing terminal dampers, these adjustments result in increasing the load on the HVAC system. Increased system load can cause total system flow to drop, as illustrated in the example fan curve illustrated in FIG. 9. As shown in FIG. 9, as the terminal dampers are adjusted closed, system pressure increases from $P_1$ to $P_2$, which results in a drop in flow from $Q_1$ to $Q_2$. The express balancing mode of the predictive balancing method compensates for flow drops in the system that result from adjusting the terminal dampers during the SET steps of the balancing procedure.

Figure 10A:
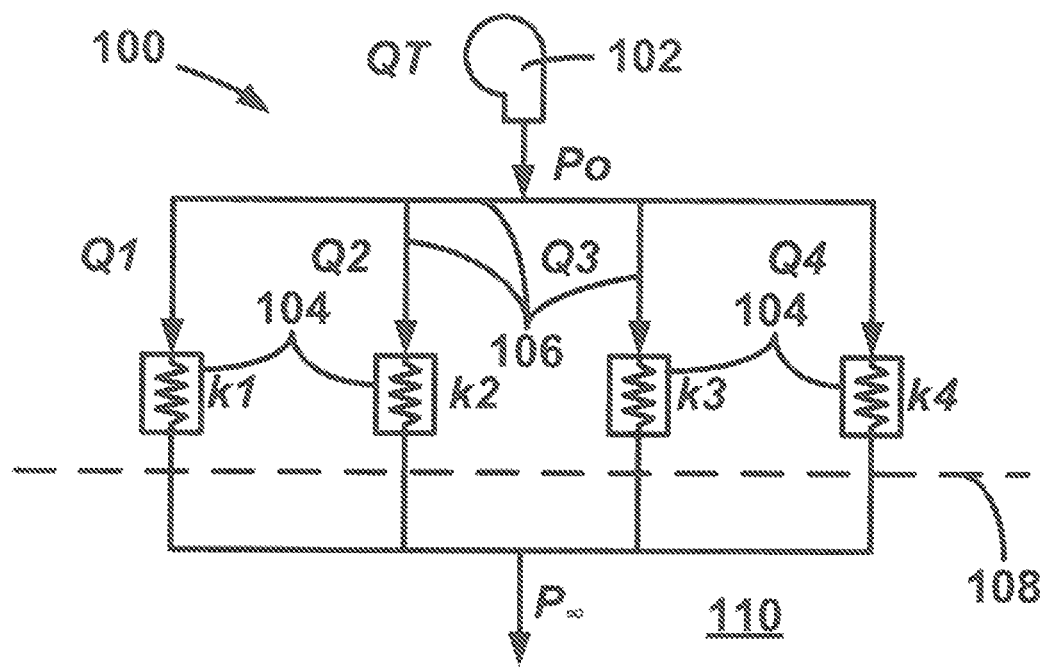
FIGS. 10A-10B are schematic diagrams illustrating certain pressure and flow characteristics of the example HVAC system.
Figure 10B:
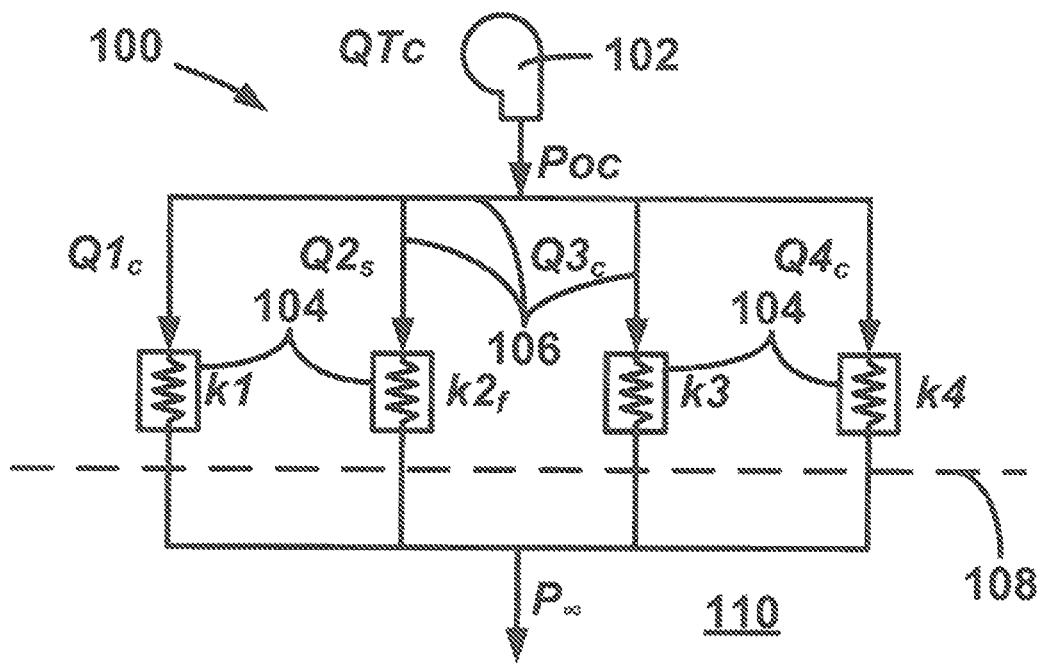

The changes in the HVAC system 100 resulting from setting terminal D2 are illustrated in FIGS. 10A and 10B. FIG. 10A shows the system 100 with no changes, prior to setting terminal D2 to achieve flow set point $Q_2$. FIG. 10B illustrates the flow at terminal D2-$Q_{s_2}$ resulting from setting terminal D2. The flows at terminals D1, D3, and D4 resulting from setting terminal D2 are $Q_{c_1}$, $Q_{c_3}$, and $Q_{c_4}$, respectively. The k-factors for terminals D1-D4 resulting from setting terminal D2 are $k_1$, $k_{2f}$, $k_3$, and $k_4$, respectively. As shown in FIG. 10B, the system total flow $Q_{Tc}$ and pressure $P_{oc}$ change as a result of the setting terminal D2.

READ Terminal D3 and SET Terminal D3

According to the express mode of the predictive balancing process 120, the flow drop in the HVAC system 100 resulting from the adjustment to terminal D2 can be approximated by the flow drop measured at another terminal in the system after the adjustment is made. The express mode of the predictive balancing process 120 performs this via the READ step 124 (see FIG. 8B), where the user is instructed to measure the flow at terminal D3 ($Q_{m_2}$) using the air flow measuring device 20, 60.

The system 10 compares this measured flow $Q_{m_2}$ to the predicted flow for that terminal $Q_{p_3}$ to estimate the drop in flow for the HVAC system 100 resulting from the adjustment to terminal D2 at the SET step 122. Using the ratio of measured to predicted flow at terminal D3, a new total flow can be calculated:

$$Q_{Tr} \cong \frac{Q_{m_3}}{Q_{p_3}} \cdot Q_T = \frac{745 \text{ cfm}}{753.1 \text{ cfm}} \cdot 2259.2 \text{ cfm} = 2234.8 \text{ cfm}$$

where $Q_{Tr}$ is the prediction of the total flow resulting from setting terminal D2 to $Q_{s_2}$.

As a result of adjusting terminal D2 and thereby changing the load in the entire HVAC system 100 due to fan curve effects, the flow ratios for each terminal is also changed:

$$r_{1r} = \frac{Q_{P1}}{Q_{PT}}, r_{2r} = \frac{Q_{P2}}{Q_{PT}}, r_{3r} = \frac{Q_{P3}}{Q_{PT}}, r_{4r} = \frac{Q_{P4}}{Q_{PT}}$$

The flow predictions also need to be adjusted to account for the fan curve effects:

$$Q_{1r} = r_{1r} \cdot Q_{Tr}, Q_{2r} = r_{2r} \cdot Q_{Tr}, Q_{3r} = r_{3r} \cdot Q_{Tr}, Q_{4r} = r_{4r} \cdot Q_{Tr}$$

The k-factors also need to be adjusted as a result of changes in the dynamics in the flow path to each terminal of the system. The k-factors referred to and used herein are not associated with a single component, such as an elbow, damper, etc. Instead, the k-factors referred to and used herein are associated with losses at the terminal associated with flow detachment, recirculation region(s), and flow splits within the HVAC system 100. Revised k-factors are calculated as follows:

$$k_{1r} = \frac{\sqrt{\Delta P_r}}{Q_{1r}}, k_{2r} = \frac{\sqrt{\Delta P_r}}{Q_{2r}}, k_{3r} = \frac{\sqrt{\Delta P_r}}{Q_{3r}}, k_{4r} = \frac{\sqrt{\Delta P_r}}{Q_{4r}}$$

where $\Delta P_r = p_{oc} - p_{\infty}$. The final k-factors, $k_{f_{ir}}$, are also prompted to change as a result of the changes in the dynamics of the flow in the system:

$$k_{f_{2r}} = \frac{Q_{f_1} \sqrt{\Delta P_r}}{Q_{1r} Q_{f_2}}, k_{f_{3r}} = \frac{Q_{f_1} \sqrt{\Delta P_r}}{Q_{1r} Q_{f_3}}, k_{f_{4r}} = \frac{Q_{f_1} \sqrt{\Delta P_r}}{Q_{1r} Q_{f_4}}$$

Referring to FIG. 8B, the process 120 proceeds to SET step 130, where terminal D3 is adjusted to a flow set point that accounts for the flow drop that resulted from the terminal D2 adjustment and the resulting variation in the k-factors of the branches. The set point $Q_{s_{33}}$ is determined using Equation 7 (or 5):

$$Q_{s_{33}} = \frac{Q_{Tr}}{1 + \left[\frac{Q_{f_1}}{Q_{1r} Q_{f_{3r}}} \cdot \left(Q_{1r} + \frac{Q_{1r} Q_{f_{2r}}}{Q_{f_1}} + Q_{4r}\right)\right]} = 443.02 \text{ cfm}$$

Reset predicted flows ($Q_{p_{ir}}$) are determined using Equations 13, 14 and 16 (or 9, 10 and 12):

$$Q_{P11} = \frac{Q_{Tr}}{1 + \left[\frac{1}{Q_{1r}}\left(\frac{Q_{1r} Q_{f_{2r}}}{Q_{f_1}} + \frac{Q_{1r} Q_{f_{3r}}}{Q_{f_1}} + Q_{4r}\right)\right]} = 443.02 \text{ cfm}$$

$$Q_{P22} = \frac{Q_{Tr}}{1 + \left[\frac{Q_{f_1}}{Q_{1r} Q_{f_{2r}}}\left(\frac{Q_{1r} Q_{f_{3r}}}{Q_{f_1}} + Q_{1r} + Q_{4r}\right)\right]} = 443.02 \text{ cfm}$$

$$Q_{P44} = \frac{Q_{Tr}}{1 + \left[\frac{1}{Q_{4r}}\left(\frac{Q_{1r} Q_{f_{2r}}}{Q_{f_1}} + \frac{Q_{1r} Q_{f_{3r}}}{Q_{f_1}} + Q_{1r}\right)\right]} = 891.74 \text{ cfm}$$

And new predicted total flow after reset, $Q_{PTr}$, based on the above predictions after reset:

$$Q_{PTr} \cong Q_{s_{33}} + (Q_{P11} + Q_{P22} + Q_{P44}) = 2220.8 \text{ cfm}$$

Compared to the originally predicted total flow:

$$Q_{PT} = 2259.2 \text{ cfm}$$

READ Terminal D4 and SET Terminal D4

Like the flow drop resulting from the setting terminal D2, the flow drop resulting from setting terminal D3 can be approximated as the difference in the flow drop at another terminal in the system after the adjustment is made. Accordingly, the process 120 proceeds to READ step 132 (see FIG. 8B), where the flow at terminal D4 is measured ($Q_{m_{44}}$) and compared to the predicted flow ($Q_{P_{44}}$).

$$Q_{m_{44}} = 860 \text{ cfm } Q_{P_{44}} = 891.74 \text{ cfm}$$

Using a ratio of measured to predicted flow at terminal D4, a new total flow ($Q_{Trr}$) can be calculated:

$$Q_{Trr} = \frac{Q_{m44}}{Q_{P44}} \cdot Q_{Tr} = 2154.48 \text{ cfm}$$

where $Q_{Trr}$ is the new predicted total system flow resulting from setting terminal D3 to $Q_{s_{33}}$.

Next, to maintain accuracy, the error between the terminal D4 measured flow ($Q_{m44}$) and the terminal D4 predicted based on the closing of terminal D3 ($Q_{P44}$) is determined:

$$Err_4 \cong 1 - \frac{Q_{m44}}{Q_{P44}} = 3.48\%$$

If $Err_4$ is greater than 1%, flow ratios are recalculated ($r_{irr}$) and terminal 3 is reset.

$$r_{1rr} = \frac{Q_{P11}}{Q_{PTr}}, r_{2rr} = \frac{Q_{P22}}{Q_{PTr}}, r_{3rr} = \frac{Q_{P33}}{Q_{PTr}}, r_{4rr} = \frac{Q_{P44}}{Q_{PTr}}$$

flow set points are re-adjusted ($Q_{Irr}$):

$$Q_{1rr} = r_{1rr} \cdot Q_{Trr}, Q_{2rr} = r_{2rr} \cdot Q_{Trr}$$

$$Q_{3rr} = r_{3rr} \cdot Q_{Trr}, Q_{4rr} = r_{4rr} \cdot Q_{Trr}$$

and k-factors are reset ($k_{Irr}$ and $k_{f_{Irr}}$):

$$k_{1rr} \cong \frac{1}{Q_{1rr}}, k_{2rr} \cong \frac{1}{Q_{2rr}}, k_{3rr} \cong \frac{1}{Q_{3rr}}, k_{4rr} \cong \frac{1}{Q_{4rr}}$$

$$k_{f2rr} \cong \frac{Q_{f3}}{Q_{1rr} \cdot Q_{f2}}, k_{f3rr} \cong \frac{Q_{f1}}{Q_{1rr} \cdot Q_{f3}}, k_{f4rr} \cong \frac{Q_{f1}}{Q_{1rr} \cdot Q_{f4}},$$

Referring to FIG. 8B, the process 120 proceeds to SET step 136, where terminal D4 is adjusted to a flow set point that accounts for the flow drop that resulted from the terminal D3 adjustment and the resulting variation in the k-factors of the branches. The set point $Q_{s_{444}}$ is determined using Equation 8 (or 6):

$$Q_{s444} \cong \frac{Q_{Trr}}{1 + \left[\frac{Q_{f1}}{Q_{1rr}Q_{f4rr}} \cdot \left(Q_{1rr} + \frac{Q_{1rr}Q_{f2rr}}{Q_{f1}} + \frac{Q_{1rr}Q_{f3rr}}{Q_{f1}}\right)\right]} = 535.43 \text{ cfm}$$

Reset predicted flows ($Q_{PIII}$) are determined using Equations 13 and 14 (or 9 and 10):

$$Q_{P111} \cong \frac{Q_{Trr}}{1 + \left[\frac{1}{Q_{1rr}} \cdot \left(\frac{Q_{1rr}Q_{f3rr}}{Q_{f1}} + \frac{Q_{1rr}Q_{f2rr}}{Q_{f1}} + \frac{Q_{1rr}Q_{f4rr}}{Q_{f1}}\right)\right]} = 535.43 \text{ cfm}$$

$$Q_{P222} \cong \frac{Q_{Trr}}{1 + \left[\frac{Q_{f1}}{Q_{1rr}Q_{f2rr}} \cdot \left(Q_{1rr} + \frac{Q_{1rr}Q_{f3rr}}{Q_{f1}} + \frac{Q_{1rr}Q_{f4rr}}{Q_{f1}}\right)\right]} = 535.43 \text{ cfm}$$

$$Q_{P333} \cong \frac{Q_{Trr}}{1 + \left[\frac{Q_{f1}}{Q_{1rr}Q_{f3rr}} \cdot \left(\frac{Q_{1rr}Q_{f4rr}}{Q_{f1}} + \frac{Q_{1rr}Q_{f2rr}}{Q_{f1}} + Q_{1rr}\right)\right]} = 535.43 \text{ cfm}$$

Total flow is predicted based on the newly predicted flows:

$$Q_{PTrrr} \cong Q_{s444} + (Q_{P111} + Q_{P222} + Q_{P333}) = 2141.72 \text{ cfm}$$

At this point, the terminals D1-D4 have been adjusted to proportional balance. In the illustrated example, proportional balance has all of terminals D1-D4 at equal flow. Although the flows through terminals are proportionally balanced, they are higher than the target flow rates of 450 cfm. To correct this, the process 120 proceeds to step 142, where the fan or blower (see FIGS. 7A-7C) of the HVAC system 100 is adjusted is adjusted while using the air flow hood 20, 60 to monitor air flow through any one of terminals D1-D4. When the monitored terminal reads target flow rate (450 cfm), the other terminals will also discharge air at the target flow rate, and the balancing process 120 is complete. The express balancing mode of the predictive balancing process 120 can be a preferred or default mode because it is both fast and accurate.

Advantageously, the READ steps used to compensate for flow and k-factor impacts from the SET step at the previous terminal takes place at the next terminal under adjustment. For example, the READ step taken after the SET step at terminal D2 is performed at terminal D3, which is also the next terminal under adjustment. Therefore, since the air flow measuring device 20, 60 needs to be placed at this terminal in order to perform the next SET step, it is fortuitous that the READ step also takes place at that terminal. Additionally, since performing the SET step requires that the air flow measuring device 20, 60 be positioned on the terminal and that positioning be acknowledged to the system 10 via user entry, this positioning verification can also be used to trigger the READ step used to calculate the set point for the impending SET step. Therefore, the implementation of the express mode of the predictive balancing process 120 requires virtually no additional time or effort on the part of the user.

From the above, it will be appreciated that the system 10 implements the express mode of the predictive balancing process 120 via an air flow measuring device 20, 60. To do this, the system 10 instructs the user to perform the requisite tasks (e.g., maneuvering of, or data entry into, the air flow measuring device 20, 60) for balancing the HVAC system 100. In this manner, in the express balancing mode, the system 10 prompts the user to perform the initial steps, the requisite number of SET and READ steps (depending on the number of terminals in the system 100), and the final blower adjustment step.

Predictive Balancing Process—Precision Mode

The precision mode of the predictive balancing process 120 for balancing the HVAC system 100 (see FIGS. 7A-7C) is illustrated in FIG. 8C. The precision balancing mode provides compensation for k-factor impacts that go above and beyond the compensation provided in the express mode, which further improves the accuracy of the balance. This is done by introducing the RESET step, which involves re-adjusting the terminal under adjustment based on a k-factor impact estimated from the READ step. In the precision balancing mode, the process 120 is able to predict the changes in the system as a result of adjusting a terminal and correct the adjustment to that same terminal accordingly.

Initial Steps

The initial steps 118 of the predictive balancing process 120 in the precision balancing mode (FIG. 8C) are similar or identical to those in the ideal and express modes (FIGS. 8A and 8B, respectively). Implementing the precision balancing mode of the predictive balancing process 120, the system 10 instructs the user to perform tasks through the user interface 40 or smart device 74 of the air flow hood 20, 60. In the precision mode, the predictive balancing process 120 begins with the initial steps 118, where the system 10 instructs the user to enter system information (number of terminals, target flow rates, terminal types/configurations), ensure that all terminals are full open, and obtain initial flow readings from each terminal.

For the sake of comparing the different modes, in this description, we illustrate the example performance of the precision mode of the predictive balancing process on a system that is identical to the system described above with regard to the ideal and express mode balancing examples. Thus, the example implementation of the precision mode assumes for terminals D1-D4 the same initial measured flows through the terminals and the same target flows for the terminals. The initial flow ratios for the terminals are also the same and dictate the same terminal balancing order for the precision mode example.

The overall balancing strategy implemented in the precision mode is essentially the same as the other modes, i.e., each terminal is adjusted to achieve a flow at that terminal for the current state of the system 100 that corresponds to system balance once all other terminals are adjusted. The flow to which each terminal is adjusted is therefore a flow that the system 10, implementing the precision mode of the predictive balancing method 120, predicts will result in that terminal achieving its target flow, $Q_{f_i}$, when all other terminals are adjusted. According to this method, balancing the final terminal (D4 in the present example) will bring the entire HVAC system 100 into balance. The precision mode differs from the ideal and express modes in that it provides, via READ and RESET steps, additional compensation for the effects that adjusting the terminal under adjustment has on the k-factors for the remaining terminals. This is accomplished via the RESET step, described below, which is implemented in the precision balancing mode.

FIG. 8C illustrates a SET-READ-RESET pattern that is characteristic of the precision mode of the predictive balancing process 120. According to the precision mode of the process 120, terminal D2 is adjusted at SET step 122 to a set point calculated according to the equations disclosed herein, flow through terminal D3 is measured at READ step 124, and terminal D2 is re-adjusted at RESET step 126 to a set point that re-calculated to take into account an error ratio of predicted to measured flow at terminal D3, the measured flow being that flow measurement obtained during the READ step 124. Terminal D3 is then adjusted at SET step 130 to a calculated set point, flow through terminal D4 is measured at READ step 132, and terminal D3 is re-adjusted at RESET step 134 to a set point that re-calculated to take into account an error ratio of predicted to measured flow at terminal D4, the measured flow being that flow measurement obtained during the READ step 132.

This SET-READ-RESET pattern of steps in the process 120 continues in this manner through every terminal in the HVAC system 100, regardless of the size of the system and number of terminals in the system, until the last terminal is encountered. In the illustrated HVAC system 100, terminal D4 is the last terminal to be set. When the terminal D4 is encountered, the process 120 proceeds as follows: terminal D4 is adjusted at SET step 136, flow through terminal D3 is measured at READ step 138, and terminal D4 is re-adjusted at RESET step 140. Although carried out in the same SET-READ-RESET pattern, it is done so "backwards" so to speak, using the previous terminal D3 for the READ step 138, which is used to determine the error ratio for performing the RESET step 140 at terminal D4. At this point, the system 100 is balanced, and the process can proceed to step 142, where the fan speed is adjusted to bring the balanced flows to target.

SET Terminal D2, READ Terminal D3, and RESET Terminal D2

The flow through terminal D2 is initially adjusted according to SET step 122 in the same manner as depicted above in the ideal and express modes. After setting terminal D2, the flow through terminal D3 is measured at READ step 124 and used to determine the flow drop at that terminal. The flow drop at terminal D3 is approximated as the difference between the flow that was predicted to result from the adjustment ($Q_{p_3}$) and an actual measured flow that resulted from the adjustment ($Q_{m_3}$). The flow drop can be approximated at any terminal in the system other than the terminal under adjustment, but selecting the terminal with the lowest k-factor ensures the highest resolution for correction. In the illustrated example, this is terminal D3, so terminal D3 is used.

Using the ratio of measured to predicted flow at terminal D3, a new predicted total flow can be calculated:

$$Q_{Tr} \cong \frac{Q_{m_3}}{Q_{p_3}} \cdot Q_T = \frac{745 \text{ cfm}}{753.1 \text{ cfm}} \cdot 2259.2 \text{ cfm} = 2234.8 \text{ cfm}$$

where $Q_{Tr}$ is the prediction of the total flow resulting from setting terminal D2 to $Q_{s_2}$. The impact over system as a result of closing the damper is computed as $$Err_3 \cong 1 - \frac{Q_{m_3}}{Q_{p_3}} = 1 - \frac{745 \text{ cfm}}{753.1 \text{ cfm}} = 1.076\%$$

If $Err_3$ is greater than a predetermined value, e.g., 1%, then it justified to reset terminal D2 in order to maintain accuracy. In the present example, resetting terminal D2 is justified.

As a result of adjusting terminal D2 and thereby changing the load in the entire HVAC system 100 due to fan curve effects, the flow ratios for each terminal is also changed:

$$r_{1r} = \frac{Q_{p_1}}{Q_{p_T}}, \quad r_{2r} = \frac{Q_{p_2}}{Q_{p_T}}, \quad r_{3r} = \frac{Q_{p_3}}{Q_{p_T}}, \quad r_{4r} = \frac{Q_{p_4}}{Q_{p_T}}$$

The flow predictions also need to be adjusted to account for the fan curve effects:

$$Q_{1r} = r_{1r} \cdot Q_{Tr}, \quad Q_{2r} = r_{2r} \cdot Q_{Tr}, \quad Q_{3r} = r_{3r} \cdot Q_{Tr}, \quad Q_{4r} = r_{4r} \cdot Q_{Tr}$$

The k-factors also need to be adjusted as a result of changes in the dynamics in the flow path to each terminal of the system. The revised k-factors are calculated as follows:

$$k_{1r} = \frac{\sqrt{\Delta P_r}}{Q_{1r}}, \quad k_{2r} = \frac{\sqrt{\Delta P_r}}{Q_{2r}}, \quad k_{3r} = \frac{\sqrt{\Delta P_r}}{Q_{3r}}, \quad k_{4r} = \frac{\sqrt{\Delta P_r}}{Q_{4r}}$$

The final k-factors, $k_{f_{ir}}$, are also prompted to change as a result of the changes in the dynamics of the flow in the system:

$$k_{f_{2r}} = \frac{Q_{f_1}\sqrt{\Delta P_r}}{Q_{1r}Q_{f_2}}, \quad k_{f_{3r}} = \frac{Q_{f_1}\sqrt{\Delta P_r}}{Q_{1r}Q_{f_3}}, \quad k_{f_{4r}} = \frac{Q_{f_1}\sqrt{\Delta P_r}}{Q_{1r}Q_{f_4}}$$

Using the re-calculated values determined in the equations set forth in the preceding paragraphs, the flow through terminal D2 is adjusted to a revised set point ($Q_{s_{2r}}$) at RESET step 126. The revised set point is calculated using Equation 7 (or 5), as shown below. The flow adjustments to terminal D2 made at RESET step 126 account for the estimated flow drop that resulted from the initial terminal D2 adjustment made at SET step 122 as measured through terminal D3 at READ step 124:

$$Q_{s_{2r}} = \frac{Q_{Tr}}{1 + \left[\frac{Q_{f_1}}{Q_{1r}Q_{f_{2r}}} \cdot (Q_{1r} + Q_{3r} + Q_{4r})\right]} = 370.1 \text{ cfm}$$

$$Q_{s_2} = 374.1 \text{ cfm}$$

Resetting terminal D2 necessitates revised predicted flows ($Q_{p_{Ir}}$) which are calculated, as shown below, using Equations 13, 14, 15 and 15 (or 9, 10, 11 and 12). For sake of comparison, the previously predicted flows ($Q_{p_{III}}$) for each terminal are also shown:

$$Q_{P_{1r}} = \frac{Q_{Tr}}{1 + \left[\frac{1}{Q_{1r}}\left(\frac{Q_{1r}Q_{f_{2r}}}{Q_{f_1}} + Q_{3r} + Q_{4r}\right)\right]} = 370.1 \text{ cfm}$$

$$Q_{P_1} = 374.1 \text{ cfm}$$

$$Q_{P_{3r}} = \frac{Q_{Tr}}{1 + \left[\frac{1}{Q_{3r}}\left(\frac{Q_{1r}Q_{f_{2r}}}{Q_{f_1}} + Q_{1r} + Q_{4r}\right)\right]} = 745 \text{ cfm}$$

$$Q_{P_3} = 753.1 \text{ cfm}$$

$$Q_{P_{4r}} = \frac{Q_{Tr}}{1 + \left[\frac{1}{Q_{4r}}\left(\frac{Q_{1r}Q_{f_{2r}}}{Q_{f_1}} + Q_{3r} + Q_{1r}\right)\right]} = 749.7 \text{ cfm}$$

$$Q_{P_4} = 757.9 \text{ cfm}$$

And new predicted total flow after reset, $Q_{P_{Tr}}$, based on the above predictions after reset:

$$Q_{P_{Tr}} \cong Q_{s_{2r}} + (Q_{P_{1r}} + Q_{P_{3r}} + Q_{P_{4r}}) = 2234.8 \text{ cfm}$$

Compared to the originally predicted total flow:

$$Q_{PT} = 2259.2 \text{ cfm}$$

At this point, through the precision mode of the predictive balancing process 120, the flow through terminal D2 is adjusted to a value that compensates for system load changes resulting from the adjustment. The adjusted flow at terminal D2 and the newly predicted flows for the remaining terminals can now be used to adjust terminal D3 in an identical manner.

SET Terminal D3

Having SET and RESET terminal D2 at steps 122 and 126, respectively, terminal D3 is ready to be adjusted, since it has the next lowest flow to target ratio. The process 120 essentially repeats the steps used to adjust terminal D2, i.e., SET, READ, and RESET, as shown in FIG. 8C. To execute the SET step 130, the system 10 instructs the user to move the air flow hood 20, 60 to terminal D3. Once the user acknowledges that the air flow hood 20, 60 is in place at terminal D3 (e.g., via the user interface 40 or smart device 74 of the air flow hood 20, 60), the system 10 can take advantage of the hood placement and take an air flow measurement at terminal D3, measuring the actual flow through the terminal resulting from the RESET step 126 of terminal D2. This measured terminal D3 flow after reset, $Q_{m_{3r}}$, accounts for the changes brought into the system due to the adjusting of terminal D2:

$$Q_{m_{3r}} = 735 \text{ cfm} \quad Q_{m_3} = 745 \text{ cfm}$$

A ratio of the D3 measured flow after reset $Q_{m_{3r}}$ to the previously measured D3 flow $Q_{m_3}$ is used to determine a new predicted total system flow $Q_{T_{rr}}$:

$$Q_{T_{rr}} = \frac{Q_{m_3}}{Q_{m_{3r}}} \cdot Q_{Tr} = \frac{745 \text{ cfm}}{735 \text{ cfm}} \cdot 2234.8 \text{ cfm} = 2289.9 \text{ cfm}$$

where $Q_{T_{rr}}$ is the new predicted total system flow resulting from adjusting terminal D2 to $Q_{s_{2r}}$.

To maintain accuracy, the error between the predicted terminal D3 flow $Q_{P_{3r}}$ and the actual terminal D3 measured flow after reset $Q_{m_{3r}}$ can be determined:

$$Err_3 \cong 1 - \frac{Q_{m_{3r}}}{Q_{P_{3r}}} = 1 - \frac{735 \text{ cfm}}{745 \text{ cfm}} = 1.342\%$$

If $Err_3$ is greater than a predetermined threshold error, such as 1%, flow ratios are recalculated ($r_{irr}$):

$$r_{1rr} = \frac{Q_{P_{1r}}}{Q_{PT_r}}, \quad r_{2rr} = \frac{Q_{P_{2r}}}{Q_{PT_r}}, \quad r_{3rr} = \frac{Q_{P_{3r}}}{Q_{PT_r}}, \quad r_{4rr} = \frac{Q_{P_{4r}}}{Q_{PT_r}}$$

flow set points are re-adjusted ($Q_{irr}$):

$$Q_{1rr} = r_{1rr} \cdot Q_{Trr}, \quad Q_{2rr} = r_{2rr} \cdot Q_{Trr}$$

$$Q_{3rr} = r_{3rr} \cdot Q_{Trr}, \quad Q_{4rr} = r_{4rr} \cdot Q_{Trr}$$

and k-factors are recalculated ($k_{irr}$ and $k_{f_{irr}}$):

$$k_{1rr} \cong \frac{1}{Q_{1rr}}, \quad k_{2rr} \cong \frac{1}{Q_{2rr}}, \quad k_{3rr} \cong \frac{1}{Q_{3rr}}, \quad k_{4rr} \cong \frac{1}{Q_{4rr}}$$

$$k_{f_{2rr}} \cong \frac{Q_{f_1}}{Q_{1rr} \cdot Q_{f_2}}, \quad k_{f_{3rr}} \cong \frac{Q_{f_1}}{Q_{1rr} \cdot Q_{f_3}}, \quad k_{f_{4rr}} \cong \frac{Q_{f_1}}{Q_{1rr} \cdot Q_{f_4}}$$

Referring to FIG. 8C, the process 120 proceeds to SET step 130, where the system 10 instructs the user to adjust terminal D3 to a flow set point that compensates for the flow drop resulting from the terminal D2 adjustment and the resulting variation in the k-factors of the branches. The set point $Q_{s_{33}}$ is determined using Equation 7 (or 5) and implementing values calculated based on the newly measured actual flow $(Q_{m_{3_r}})$:

$$Q_{s33} \cong \frac{Q_{Trr}}{1 + \left[\frac{Q_{f1}}{Q_{1rr}Q_{f3rr}} \cdot \left(Q_{1rr} + \frac{Q_{1rr}Q_{f2rr}}{Q_{f1}} + Q_{4rr}\right)\right]} = 455.6 \text{ cfm}$$

Air flow at the other terminals is predicted based on the effect of closing terminal D3, using Equations 13, 14 and 16 (or 9, 10 and 12):

$$Q_{P11} \cong \frac{Q_{Trr}}{1 + \left[\frac{1}{Q_{1rr}} \cdot \left(\frac{Q_{1rr}Q_{f3rr}}{Q_{f1}} + \frac{Q_{1rr}Q_{f2rr}}{Q_{f1}} + Q_{4rr}\right)\right]} = 455.6 \text{ cfm}$$

$$Q_{P22} \cong \frac{Q_{Trr}}{1 + \left[\frac{Q_{f1}}{Q_{1rr}Q_{f2rr}} \cdot \left(Q_{1rr} + \frac{Q_{1rr}Q_{f3rr}}{Q_{f1}} + Q_{4rr}\right)\right]} = 455.6 \text{ cfm}$$

$$Q_{P44} \cong \frac{Q_{Trr}}{1 + \left[\frac{1}{Q_{4rr}} \cdot \left(\frac{Q_{1rr}Q_{f3rr}}{Q_{f1}} + \frac{Q_{1rr}Q_{f2rr}}{Q_{f1}} + Q_{1rr}\right)\right]} = 923.1 \text{ cfm}$$

Total flow is predicted based on these newly predicted flows:

$$Q_{PTrr} \cong Q_{s33} + (Q_{P11} + Q_{P22} + Q_{P44}) = 2289.9 \text{ cfm}$$

READ Terminal D4 and RESET Terminal D3

Like the flow drop resulting from the adjustment to terminal D2, the flow drop resulting from the adjustment to terminal D3 can be approximated as the difference in the flow drop at another terminal in the system after the adjustment is made. Selecting the terminal with the lowest k-factor ensures the highest resolution for correction. In the illustrated example, this is terminal D4. Having adjusted terminal D3 at SET step 130, the process 120 proceeds to READ step 132 and the system 10 instructs the user to measure the flow at terminal D4 $(Q_{m_{44}})$. In the example of FIG. 8C, the measured terminal D4 flow $Q_{m_{44}}$ and the previously predicted terminal D4 flow $Q_{P44}$ are:

$$Q_{m44} = 860 \text{ cfm} \quad Q_{P44} = 923.1 \text{ cfm}$$

Using a ratio of measured to predicted flow at terminal D4, a new total flow $(Q_{Trrr})$ can be calculated:

$$Q_{Trrr} = \frac{Q_{m44}}{Q_{P44}} \cdot Q_{Trr} = 2133.4 \text{ cfm}$$

where $Q_{Trrr}$ is the new predicted total system flow resulting from adjusting terminal D3 to $Q_{s33}$.

Next, to maintain accuracy, the error between the terminal D4 measured flow $(Q_{m_{44}})$ and the terminal D4 predicted based on the closing of terminal D3 $(Q_{P44})$ is determined:

$$Err_4 \cong 1 - \frac{Q_{m44}}{Q_{P44}} = 6.835\%$$

If $Err_4$ is greater than 1%, flow ratios are recalculated $(r_{Irrr})$ and terminal 3 is reset.

$$r_{1rrr} = \frac{Q_{P11}}{Q_{PTrr}}, \quad r_{2rrr} = \frac{Q_{P22}}{Q_{PTrr}}, \quad r_{3rrr} = \frac{Q_{P33}}{Q_{PTrr}}, \quad r_{4rrr} = \frac{Q_{P44}}{Q_{PTrr}}$$

flow set points are re-adjusted $(Q_{Irrr})$:

$$Q_{1rrr} = r_{1rrr} \cdot Q_{Trrr}, \quad Q_{2rrr} = r_{2rrr} \cdot Q_{Trrr}$$

$$Q_{3rrr} = r_{3rrr} \cdot Q_{Trrr}, \quad Q_{4rrr} = r_{4rrr} \cdot Q_{Trrr}$$

and k-factors are reset $(k_{Irrr}$ and $k_{f_{Irrr}})$:

$$k_{1rrr} \cong \frac{1}{Q_{1rrr}}, k_{2rrr} \cong \frac{1}{Q_{2rrr}}, k_{3rrr} \cong \frac{1}{Q_{3rrr}}, k_{4rrr} \cong \frac{1}{Q_{4rrr}}$$

$$k_{f2rrr} \cong \frac{Q_{f3}}{Q_{1rrr} \cdot Q_{f2}}, k_{f4rrr} \cong \frac{Q_{f1}}{Q_{1rrr} \cdot Q_{f3}}, k_{f4rrr} \cong \frac{Q_{f1}}{Q_{1rrr} \cdot Q_{f4}},$$

Having measured the flow through terminal D4 at READ step 132, the process proceeds to RESET step 134, and instructs the user to position the air flow hood 20, 60 at terminal D3. Once the user acknowledges that the air flow hood 20, 60 is positioned at terminal D3, the system 100 instructs the user to adjust terminal D3 to the reset calculated flow set point $Q_{s33r}$ (Equation 7 (or 5), see below). Adjusting terminal D3 at RESET step 134 uses the measured D4 flow obtained at READ step 132 to compensate for the flow drop that resulted from the terminal D3 adjustment at SET step 130:

$$Q_{s33r} \cong \frac{Q_{Trrr}}{1 + \left[\frac{Q_{f1}}{Q_{1rrr}Q_{f3rrr}} \cdot \left(Q_{1rrr} + \frac{Q_{1rrr}Q_{f2rrr}}{Q_{f1}} + Q_{4rrr}\right)\right]} = 455.3 \text{ cfm}$$

$$Q_{s33} = 455.615 \text{ ft}^3/\text{min}$$

Resetting terminal D3 necessitates revised predicted flows $(Q_{P_{Ir}})$ which are calculated, as shown below, using Equations 13, 14 and 16 (or 9, 10 and 12). For sake of comparison, the previously predicted flows $(Q_{P_{Ii}})$ for each terminal are also shown:

$$Q_{P11r} \cong \frac{Q_{Trrr}}{1 + \left[\frac{1}{Q_{1rrr}} \cdot \left(\frac{Q_{1rrr}Q_{f3rrr}}{Q_{f1}} + \frac{Q_{1rrr}Q_{f2rrr}}{Q_{f1}} + Q_{4rrr}\right)\right]} = 455.263 \text{ cfm}$$

$$Q_{P11} = 455.615 \text{ cfm}$$

$$Q_{P22r} \cong \frac{Q_{Trrr}}{1 + \left[\frac{Q_{f1}}{Q_{1rrr}Q_{f2rrr}} \cdot \left(Q_{1rrr} + \frac{Q_{1rrr}Q_{f3rrr}}{Q_{f1}} + Q_{4rrr}\right)\right]} = 455.263 \text{ cfm}$$

$$Q_{P22} = 455.615 \text{ cfm}$$

-continued $$Q_{P44r} \cong \frac{Q_{Trrr}}{1 + \left[\frac{1}{Q_{4rrr}} \cdot \left(\frac{Q_{1rrr}Q_{f3rrr}}{Q_{f_1}} + \frac{Q_{1rrr}Q_{f2rrr}}{Q_{f_1}} + Q_{1rrr}\right)\right]} = 767.634 \text{ cfm}$$

$$Q_{P44} = 923.093 \text{ cfm}$$

Total flow is predicted based on the newly predicted flows:

$$Q_{PTrrr} \cong Q_{s33r} + (Q_{P11r} + Q_{P22r} + Q_{P44r}) = 2133.422 \text{ cfm}$$

SET Terminal D4

Having SET and RESET terminal D3 at steps 130 and 134, respectively, terminal D4 is ready to be adjusted, since it has the next lowest flow to target ratio. Again, the process 120 essentially repeats the steps used to adjust terminals D2 and D3, i.e., SET, READ, and RESET, as shown in FIG. 8C. To execute the SET step 136, the system 10 instructs the user to move the air flow hood 20, 60 to terminal D4. Once the user acknowledges that the air flow hood 20, 60 is in place at terminal D4 (e.g., via the user interface 40 or smart device 74 of the air flow hood 20, 60), the system 10 can take advantage of the hood placement and take an air flow measurement at terminal D4, measuring the actual flow through the terminal resulting from the RESET step 134 of terminal D3. This measured terminal D4 flow after reset, $Q_{m44r}$, accounts for the changes brought into the system due to the adjusting of terminal D3:

$$Q_{m44r} = 735 \text{ cfm } Q_{m44} = 760 \text{ cfm}$$

A ratio of the D4 measured flow $Q_{m44}$ to the D4 flow measured after reset $Q_{m44r}$ is used to determine a new predicted total system flow $Q_{Trrrr}$:

$$Q_{Trrrr} = \frac{Q_{m44}}{Q_{m44r}} \cdot Q_{Trrr} = 2496.2 \text{ cfm}$$

where $Q_{Trrrr}$ is the new predicted total system flow resulting from adjusting terminal D3 to $Q_{s33r}$.

Next, to maintain accuracy, the error between the predicted terminal D4 flow $Q_{P44r}$ and the actual terminal D4 measured flow after reset $Q_{m44r}$ is determined:

$$Err_4 \cong 1 - \frac{Q_{m44r}}{Q_{P44r}} = 4.251\%$$

If $Err_4$ is greater than a predetermined threshold error, such as 1%, flow ratios are recalculated ($r_{1rrrr}$):

$$r_{1rrrr} = \frac{Q_{P1r}}{Q_{PTrrrr}}, \quad r_{2rrrr} = \frac{Q_{P2r}}{Q_{PTrrrr}},$$

$$r_{3rrrr} = \frac{Q_{P3r}}{Q_{PTrrrr}}, \quad r_{4rrrr} = \frac{Q_{P4r}}{Q_{PTrrrr}}$$

flow set points are re-adjusted ($Q_{1rrrr}$):

$$Q_{1rrrr} = r_{1rrrr} \cdot Q_{Trrrr}, \quad Q_{2rrrr} = r_{2rrrr} \cdot Q_{Trrrr}$$

$$Q_{3rrrr} = r_{3rrrr} \cdot Q_{Trrrr}, \quad Q_{4rrrr} = r_{4rrrr} \cdot Q_{Trrrr}$$

and k-factors are reset ($k_{1rrrr}$ and $k_{f1rrrr}$):

$$k_{1rrrr} \cong \frac{1}{Q_{1rrrr}}, k_{2rrrr} \cong \frac{1}{Q_{2rrrr}}, k_{3rrrr} \cong \frac{1}{Q_{3rrrr}}, k_{4rrrr} \cong \frac{1}{Q_{4rrrr}}$$

$$k_{f2rrrr} \cong \frac{Q_{f_1}}{Q_{1rrrr} \cdot Q_{f_2}}, k_{f3rrrr} \cong \frac{Q_{f_1}}{Q_{1rrrr} \cdot Q_{f_3}}, k_{f4rrrr} \cong \frac{Q_{f_1}}{Q_{1rrrr} \cdot Q_{f_4}},$$

Referring to FIG. 8C, the process 120 proceeds to SET step 136, where the system 10 instructs the user to adjust terminal D4 to a flow set point that compensates for the flow drop resulting from the terminal D3 adjustment and the resulting variation in the k-factors of the branches. The set point $Q_{s444}$ is determined using Equation 8 (or 6) and implementing values calculated based on the newly measured actual flow ($Q_{m44r}$):

$$Q_{s444} \cong \frac{Q_{Trrrr}}{1 + \left[\frac{Q_{f_1}}{Q_{1rrrr}Q_{f4rrrr}} \cdot \left(Q_{1rrrr} + \frac{Q_{1rrrr}Q_{f2rrrr}}{Q_{f_1}} + \frac{Q_{1rrrr}Q_{f3rrrr}}{Q_{f_1}}\right)\right]} = 624.1 \text{ cfm}$$

Predict the flow from the other terminals based on the effect of closing terminal D4 using Equations 13 and 14 (or 9 and 10):

$$Q_{p111} \cong \frac{Q_{Trrrr}}{1 + \left[\frac{1}{Q_{1rrrr}} \cdot \left(\frac{Q_{1rrrr}Q_{f3rrrr}}{Q_{f_1}} + \frac{Q_{1rrrr}Q_{f2rrrr}}{Q_{f_1}} + \frac{Q_{1rrrr}Q_{f4rrrr}}{Q_{f_1}}\right)\right]} = 624.1 \text{ cfm}$$

$$Q_{p222} \cong \frac{Q_{Trrrr}}{1 + \left[\frac{Q_{f_1}}{Q_{1rrrr}Q_{f2rrrr}} \cdot \left(Q_{1rrrr} + \frac{Q_{1rrrr}Q_{f3rrrr}}{Q_{f_1}} + \frac{Q_{1rrrr}Q_{f4rrrr}}{Q_{f_1}}\right)\right]} = 624.1 \text{ cfm}$$

$$Q_{p333} \cong \frac{Q_{Trrrr}}{1 + \left[\frac{Q_{f_1}}{Q_{1rrrr}Q_{f3rrrr}} \cdot \left(Q_{1rrrr} + \frac{Q_{1rrrr}Q_{f2rrrr}}{Q_{f_1}} + \frac{Q_{1rrrr}Q_{f4rrrr}}{Q_{f_1}}\right)\right]} = 624.1 \text{ cfm}$$

And predict the total flow based on the newly predicted flows:

$$Q_{PTrrrr} \cong Q_{s444} + (Q_{P111} + Q_{P222} + Q_{P333}) = 2496.2 \text{ cfm}$$

READ Terminal D3 and RESET Terminal D4

Like the flow drop resulting from the adjustment to terminals D2 and D3, the flow drop resulting from the adjustment to terminal D4 can be approximated as the difference in the flow drop at another terminal in the system after the adjustment is made. Since terminal D4 is the last terminal to be adjusted, the pattern of the predictive balancing process 120 deviates somewhat, as shown in FIG. 8C. Having adjusted terminal D4 at SET step 136, the process 120 proceeds to READ step 138 and the system 10 instructs the user to measure the flow at terminal D3 ($Q_{m333}$). In the example of FIG. 8C, the measured terminal D4 flow $Q_{m333}$ and the previously predicted terminal D4 flow $Q_{p333}$ are:

$$Q_{m333} \cong 526 \text{ cfm } Q_{p333} \cong 624.1 \text{ cfm}$$

Note that terminal D3 is measured purely out of convenience, presuming that it is nearest to terminal D4 and easy to get to. Any of terminals D1-D3 can be used for this step. Once flow through the terminal is measured, total flow is determined yet again:

$$Q_{Trrrr} = \frac{Q_{m333}}{Q_{P333}} \cdot Q_{Trrr} = 2104 \text{ cfm}$$

where $Q_{Trrrr}$ is the predicted total flow resulting from setting terminal D4 to $Q_{s444}$. $Err_4$ is computed again in order to determine if is necessary to reset terminal D4, as $$Err_4\% \cong 1 - \frac{Q_{m44r}}{Q_{P44r}} = 4.251\%$$

Having measured the flow through terminal D3 at READ step 138, the process proceeds to RESET step 140, and instructs the user to position the air flow hood 20, 60 at terminal D4. Once the user acknowledges that the air flow hood 20, 60 is positioned at terminal D3, the system 100 instructs the user to adjust terminal D4 to the reset calculated flow set point $Q_{s444r}$ (Equation 8 (or 6), see below). Adjusting terminal D4 at RESET step 140 uses the measured D3 flow obtained at READ step 138 to compensate for the flow drop that resulted from the terminal D4 adjustment at SET step 136:

$$Q_{s444r} \cong \frac{Q_{Trrrr}}{1 + \left[\frac{Q_{f1}}{Q_1 Q_{f4}} \cdot \left(Q_1 + \frac{Q_1 Q_{f2}}{Q_{f1}} + \frac{Q_1 Q_{f3}}{Q_{f1}}\right)\right]} = 526 \text{ cfm}$$

$$Q_{s444} = 624.1 \text{ cfm}$$

Resetting terminal D4 accounts for the flow drop that resulted from the terminal D4 adjustment. Since terminal D4 is the last terminal to be adjusted, one would expect that the D4 reset flow set point $Q_{s444r}$ and the reset predicted flows $Q_{P_{IIIr}}$ (see below) would be equal. Although not implemented in any further calculation or terminal adjustment, the reset predicted flows $Q_{P_{IIIr}}$ are shown below along with previously predicted flows ($Q_{P_{III}}$) for comparison:

$$Q_{P111r} \cong \frac{Q_{Trrrr}}{1 + \left[\frac{1}{Q_1} \cdot \left(\frac{Q_1 Q_{f4}}{Q_{f1}} + \frac{Q_1 Q_{f2}}{Q_{f1}} + \frac{Q_1 Q_{f3}}{Q_{f1}}\right)\right]} = 526 \text{ cfm}$$

$$Q_{P111} = 624.1 \text{ cfm}$$

$$Q_{P222r} \cong \frac{Q_{Trrrr}}{1 + \left[\frac{Q_{f1}}{Q_1 Q_{f2}} \cdot \left(Q_1 + \frac{Q_1 Q_{f4}}{Q_{f1}} + \frac{Q_1 Q_{f3}}{Q_{f1}}\right)\right]} = 526 \text{ cfm}$$

$$Q_{P222} = 624.1 \text{ cfm}$$

$$Q_{P333r} \cong \frac{Q_{Trrrr}}{1 + \left[\frac{Q_{f1}}{Q_1 Q_{f3}} \cdot \left(Q_1 + \frac{Q_1 Q_{f2}}{Q_{f1}} + \frac{Q_1 Q_{f4}}{Q_{f1}}\right)\right]} = 526 \text{ cfm}$$

$$Q_{P333} = 624.1 \text{ cfm}$$

At this point, the terminals D1-D4 have been adjusted to proportional balance. In the illustrated example, proportional balance has all of terminals D1-D4 at equal flow. Although the flows through terminals are proportionally balanced, they are higher than the target flow rates of 450 cfm. To correct this, the process 120 proceeds to step 142, where the fan or blower (see FIGS. 7A-7C) of the HVAC system 100 is adjusted is adjusted while using the air flow hood 20, 60 to monitor air flow through any one of terminals D1-D4. When the monitored terminal reads target flow rate (450 cfm), the other terminals will also discharge air at the target flow rate, and the balancing process 120 is complete.

From the above, it will be appreciated that the system 10 implements the precision mode of the predictive balancing process 120 via an air flow measuring device 20, 60. To do this, the system 10 instructs the user to perform the requisite tasks (e.g., maneuvering of, or data entry into, the air flow measuring device 20, 60) for balancing the HVAC system 100. In this manner, in the precision balancing mode, the system 10 prompts the user to perform the initial steps, the requisite number of SET, READ, and RESET steps (depending on the number of terminals in the system 100), and the final blower adjustment step.

Software Implementation

The balancing methods described above are calculation intense and therefore are best suited for implementation via software so that the calculations can be performed quickly and automatically with a high degree of precision and accuracy. Therefore, regardless of the configuration of the air flow measurement system 10, the methods described herein can be implemented in the electronics of the system.

For example, if the air flow measurement system 10 utilizes the air flow hood 20 of FIGS. 1 and 2, the methods can be implemented via a software application that is installed on the electronics 38 and can obtain air flow measurement data from the instrumentation 36. The user can enter data, receive instructions, and view results and other data via the user interface 40. As another example, if the air flow measurement system 10 utilizes the air flow hood 60 of FIG. 4, the methods can be implemented via a software application, e.g., the HVAC app, that is installed on the smart device 74, which can obtain air flow measurement data wirelessly from the instrumentation and electronics of the hood 60. In this instance, the user can enter data, receive instructions, and view results and other data via the user interface of the smart device 74 while located remotely from the air flow hood 60.

Once the HVAC technician inputs all of the relevant information regarding the HVAC system under test into the system 10 during the initial steps 118 via the user interface of the air flow hood 20, 60, the technician simply follows the instructions provided by the system via the user interface to balance the system. Following the given instructions, the operator moves the hood from terminal to terminal and makes the adjustments as instructed by the system 10 according to the selected mode of the predictive balancing process 120. Those skilled in the art will appreciate that the manner in which the technician is queried and instructed can vary greatly based on a variety of factors, such as the type of interface (e.g., smart device touch screen versus push-button driven LCD). Regardless of the manner in which the queries and instructions are presented, the process 120 will follow the same basic approaches described herein.

From the above description of the invention, those skilled in the art will perceive improvements, changes and modifications. These and other such improvements, changes and modifications within the skill of the art are intended to be covered by the appended claims.

What is claimed is:

1. A method for balancing terminals of an HVAC system using an air flow measuring device, comprising:
inputting into a computer processing portion of the air flow measuring device a predetermined target flow for each terminal;
acquiring via the air flow measuring device an initially measured air flow through each terminal, the initially measured air flow through each terminal being provided to the computer processing portion; and
adjusting each terminal in the HVAC system to a calculated flow set point according to instructions from the computer processing portion, the computer processing portion being programmed to determine the calculated flow set point for each terminal that results in each terminal being set to its respective predetermined target flow after all terminals in the HVAC system have been adjusted as instructed by the computer processing portion.

2. The method recited in claim 1, wherein adjusting each terminal in the HVAC system comprises:
positioning the air flow measuring device at a terminal under adjustment as instructed by the computer processing portion;
obtaining the calculated flow set point for the terminal under adjustment from the computer processing portion; and
adjusting the terminal under adjustment to the calculated flow set point.

3. The method recited in claim 2, wherein the computer processing portion is programmed to determine current HVAC system load conditions that are used to determine the calculated flow set point for a first terminal under adjustment as a function of the initially measured air flows and the predetermined target flow for each terminal.

4. The method recited in claim 3, wherein the computer processing portion is programmed to determine current HVAC system load conditions that are used to determine the calculated flow set point for terminals under adjustment subsequent to the first terminal under adjustment as a function of air flows resulting from prior adjustments to terminals of the HVAC system.

5. The method recited in claim 4, wherein the computer processing portion is programmed to calculate the air flows resulting from prior adjustments to terminals of the HVAC system.

6. The method recited in claim 4, wherein the computer processing portion is programmed to calculate the air flows resulting from prior adjustments to terminals of the HVAC system as a function of a resulting air flow measured at a terminal other than the terminal under adjustment.

7. The method recited in claim 2, wherein after adjusting the terminal under adjustment, the computer processing portion is programmed to instruct a user to use the air flow measuring device to acquire a measured air flow through a different terminal, the computer processing portion being further programmed to:
calculate a predicted air flow through the different terminal;
compare the measured air flow through the different terminal to the predicted air flow through the different terminal to determine an error;
in response to the error exceeding a predetermined threshold, determining a recalculated flow set point for the terminal under adjustment; and
instruct the user to re-adjust the terminal under adjustment to the recalculated flow set point.

8. The method recited in claim 7, wherein, to determine the recalculated flow set point for the terminal under adjustment, the computer processing portion is programmed to:
calculate a revised total flow for the HVAC system as a function of a previously determined total flow for the HVAC system and the error;
calculate flow ratios for each terminal as a function of a predicted flow for each terminal and the previously determined total flow for the HVAC system;
calculate revised predicted flows through each terminal as a function of the flow ratios and the revised total flow; and
determine the recalculated flow set point for the terminal under adjustment as a function of the revised total flow and the revised predicted flows.

9. The method recited in claim 2, wherein after adjusting the terminal under adjustment, the computer processing portion is programmed to instruct a user to move the air flow measuring device to a next terminal, the computer processing portion being further programmed to:
calculate a predicted air flow through the next terminal;
determine a measured air flow through the next terminal;
compare the predicted air flow through the next terminal to the measured air flow through the next terminal to determine an error;
determine a recalculated flow set point for the next terminal as a function of the error; and
instruct the user to adjust the next terminal to the recalculated flow set point.

10. The method recited in claim 9, wherein to determine the recalculated flow set point for the next terminal, the computer processing portion is programmed to:
calculate a revised total flow as a function of a previously determined total flow and the error;
calculate flow ratios for each terminal as a function of a predicted flow for each terminal and the previously determined total flow;
calculate revised predicted flows through each terminal as a function of the flow ratios and the revised total flow; and
determine the recalculated flow set point for the next terminal as a function of the revised total flow and the revised predicted flows.

11. The method recited in claim 1, wherein adjusting each terminal in the HVAC system to a calculated flow set point according to instructions from the computer processing portion comprises adjusting the air flow through each terminal while using the air flow measuring device to monitor air flow through each terminal to determine when the flow set points have been reached.

12. The method recited in claim 1, further comprising adjusting all terminals in the HVAC system to a fully open condition prior to acquiring via the air flow measuring device the initially measured air flow through each terminal in the HVAC system according to instructions from the computer processing portion.

13. The method recited in claim 1, wherein the computer processing portion is programmed to identify one of the terminals in the HVAC system as a key terminal in the HVAC system, wherein the method further comprises leaving the key terminal fully opened throughout the balancing process according to instructions from the computer processing portion.

14. The method recited in claim 13, wherein the computer processing portion is programmed to:

for each terminal in the HVAC system, determine a terminal error as a function of a ratio of its respective predetermined target flow and its respective initially measured air flow; and identify the terminal for which the terminal error is the lowest as the key terminal.

15. The method recited in claim 14, wherein the computer processing portion is programmed to identify an ascending order in which the terminals of the HVAC system are adjusted, wherein the ascending order is according to an order of magnitude of the terminal error.

* * * * *